US012641496B2

(12) United States Patent
Da Silva et al.

(10) Patent No.: US 12,641,496 B2
(45) Date of Patent: May 26, 2026

(54) METHODS AND APPARATUSES FOR EARLY DATA FORWARDING IN CONDITIONAL HANDOVER OF A UE IN MULTI-CONNECTIVITY

(71) Applicant: Telefonaktiebolaget LM Ericsson (publ), Stockholm (SE)

(72) Inventors: Icaro L.J. Da Silva, Solna (SE); Julien Muller, Rennes (FR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 632 days.

(21) Appl. No.: 17/925,637

(22) PCT Filed: May 20, 2021

(86) PCT No.: PCT/SE2021/050476
§ 371 (c)(1),
(2) Date: Nov. 16, 2022

(87) PCT Pub. No.: WO2021/236001
PCT Pub. Date: Nov. 25, 2021

(65) Prior Publication Data
US 2023/0180065 A1     Jun. 8, 2023

Related U.S. Application Data

(60) Provisional application No. 63/028,299, filed on May 21, 2020.

(51) Int. Cl.
*H04W 36/00*     (2009.01)
*H04W 36/02*     (2009.01)
(Continued)

(52) U.S. Cl.
CPC ..... *H04W 36/0027* (2013.01); *H04W 36/023* (2013.01); *H04W 36/08* (2013.01); *H04W 36/362* (2023.05); *H04W 36/38* (2013.01)

(58) Field of Classification Search
CPC ........... H04W 36/0027; H04W 36/023; H04W 36/08; H04W 36/362; H04W 36/38
See application file for complete search history.

(56) References Cited

U.S. PATENT DOCUMENTS 8,880,096 B2     11/2014  Rousu et al.
9,288,645 B1 *    3/2016  Chen ..................... H04M 3/561
(Continued)

FOREIGN PATENT DOCUMENTS

CN     107113677  A     8/2017
CN     111132239  A     5/2020
(Continued)

OTHER PUBLICATIONS

Huawei, "Early forwarding transfer for DAPS handover", 3GPP TSG-RAN WG3 Meeting #107-e, R3-200511, E-Meeting, Feb. 24-Mar. 6, 2020, 6 pages (Year: 2020).*
(Continued)

*Primary Examiner* — Asad M Nawaz
(74) *Attorney, Agent, or Firm* — Murphy, Bilak & Homiller, PLLC

(57)     ABSTRACT

Disclosed methods and apparatuses advantageously provide for early data forwarding in conditional handover of a User Equipment (UE) (14) in multi-connectivity scenarios. Early data forwarding includes data from secondary nodes (12) of the multi-connectivity.

14 Claims, 14 Drawing Sheets

(51) Int. Cl.

| | | |
|---|---|---|
| *H04W 36/08* | (2009.01) | |
| *H04W 36/36* | (2009.01) | |
| *H04W 36/38* | (2009.01) | |

(56) References Cited

U.S. PATENT DOCUMENTS

| | | | | |
|---|---|---|---|---|
| 12,464,413 | B2 * | 11/2025 | Purkayastha | ..... H04W 36/0016 |
| 12,464,428 | B1 * | 11/2025 | Ovesjö | .................... H04W 8/24 |
| 2016/0044548 | A1 * | 2/2016 | Choi | ..................... H04W 36/04 |
| | | | | 370/331 |
| 2016/0286449 | A1 * | 9/2016 | Choi | ................. H04W 36/0066 |
| 2017/0055187 | A1 * | 2/2017 | Kang | ................ H04W 36/0058 |
| 2018/0035339 | A1 | 2/2018 | Mitsui et al. | |
| 2018/0180703 | A1 | 6/2018 | Kim et al. | |
| 2019/0150045 | A1 * | 5/2019 | Li | ......................... H04W 88/06 |
| | | | | 370/331 |
| 2019/0208387 | A1 | 7/2019 | Jiang et al. | |
| 2020/0107286 | A1 | 4/2020 | Akkarakaran et al. | |
| 2020/0137715 | A1 | 4/2020 | Edge et al. | |
| 2021/0051550 | A1 * | 2/2021 | Latheef | ................. H04W 36/08 |
| 2021/0105681 | A1 * | 4/2021 | Paladugu | ........ H04W 36/00837 |
| 2022/0038963 | A1 * | 2/2022 | Zhang | ............... H04W 36/0064 |

FOREIGN PATENT DOCUMENTS

| | | | | | |
|---|---|---|---|---|---|
| CN | 111132247 | A | | 5/2020 | |
| GB | 2598058 | A | * | 2/2022 | ........ H04W 36/0061 |
| KR | 20090056629 | A | * | 6/2009 | ............ H04W 36/10 |
| WO | 2020032844 | A1 | | 2/2020 | |
| WO | 2020088651 | A1 | | 5/2020 | |
| WO | WO-2021029649 | A1 | * | 2/2021 | .......... H04W 36/362 |
| WO | WO-2021109394 | A1 | * | 6/2021 | ........ H04W 36/0061 |

OTHER PUBLICATIONS

English Translation of KR application (KR-20090056629-A) downloaded from PE2E (Year: 2025).*

Ericsson, "CHO in MR-DC operation", 3GPP TSG-RAN WG3 Meeting #107bis-e, R3-202367, Online, Apr. 20-30, 2020, 4 pages (Year: 2020).*

English Translation of WIPO application (WO-2021109394-A1) downloaded from PE2E (Year: 2025).*

"CHO in MR-DC operation", 3GPP TSG-RAN WG3 Meeting #108-e, R3-203794, Ericsson, Online, Jun. 1-12, 2020, 2 pages.

"CHO in MR-DC operation", 3GPP TSG-RAN WG3 Meeting #108-e, R3-203793, Ericsson, Online, Jun. 1-12, 2020, 6 pages.

ERICSSON , "CHO and MR-DC operation", 3GPP TSG-RAN WG2 #109e, Tdoc R2-2003035, Electronic meeting, Apr. 20-30, 2020, 1-10.

"3rd Generation Partnership Project; Technical Specification Group Radio Access Network; LTE Positioning Protocol (LPP) (Release 16)", 3GPP TS 37.355 V16.0.0, Mar. 2020, pp. 1-281.

CATT , "NR Positioning with DL/UL Measurements", 3GPP TSG RAN WG1 Ad-Hoc Meeting 1901, R1-1900312, Taipei, Jan. 21-25, 2019, 1-5.

Qualcomm Incorporated , "Enhancements on Timing Error Mitigations for improved Accuracy", 3GPP TSG RAN WG1 #104e, R1-2101468, e-Meeting, Jan. 25-Feb. 5, 2021, 1-12.

Zte , et al., "NR DL-TDOA positioning", 3GPP TSG RAN WG2 Meeting #107, R2-1909225, Prague, Czech, Aug. 26-30, 2019, 1-6.

"Enhancements on Timing Error Mitigations for improved Accuracy Discussion and Decision", 3GPP TSG RAN WG1 #104b-e, R1-2103170, Qualcomm Incorporated, e-Meeting, Apr. 12-20, 2021, 21 pages.

"Techniques mitigating UE Rx/Tx timing delays", 3GPP TSG-RAN WG1 Meeting #104-e, R1-2101754, Ericsson, e-Meeting, Jan. 25-Feb. 5, 2021, 21 pages.

3GPP, "3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.

3GPP, "3GPP TS 36.423 V16.1.0", 3rd Generation Partnership Project; Technical Specification Group Radio Access Network; Evolved Universal Terrestrial Radio Access Network (E-UTRAN); X2 application protocol (X2AP) (Release 16), Mar. 2020, 1-438.

3GPP, "3GPP TS 36.423 V16.5.0", 3rd Generation Partnership Project; Technical Specification Group Radio Access Network; Evolved Universal Terrestrial Radio Access Network (E-Utran); X2 application protocol (X2AP) (Release 16), Apr. 2021, 1-500.

3GPP, "3GPP TS 37.340 V16.1.0", 3rd Generation Partnership Project; Technical Specification Group Radio Access Network; Evolved Universal Terrestrial Radio Access (E-UTRA) and NR; Multi-connectivity; Stage 2 (Release 16), Mar. 2020, 1-74.

3GPP, "3GPP TS 37.340 V16.5.0", 3rd Generation Partnership Project; Technical Specification Group Radio Access Network; Evolved Universal Terrestrial Radio Access (E-UTRA) and NR; Multi-connectivity; Stage 2 (Release 16), Mar. 2021, 1-84.

3GPP, "3GPP TS 38.300 V16.1.0", 3rd Generation Partnership Project; Technical Specification Group Radio Access Network; NR; NR and NG-RAN Overall Description; Stage 2 (Release 16), Mar. 2020, 1-133.

3GPP, "3GPP TS 38.300 V16.5.0", 3rd Generation Partnership Project; Technical Specification Group Radio Access Network; NR; NR and NG-RAN Overall Description; Stage 2 (Release 16), Mar. 2021, 1-151.

3GPP, "3GPP TS 38.423 V16.1.0", 3rd Generation Partnership Project; Technical Specification Group Radio Access Network; NG-RAN; Xn application protocol (XnAP) (Release 16), Mar. 2020, 1-334.

3GPP, "3GPP TS 38.423 V16.5.0", 3rd Generation Partnership Project; Technical Specification Group Radio Access Network; NG-RAN; Xn application protocol (XnAP) (Release 16), Apr. 2021, 1-461.

Apple Inc., et al., "(TP for NR_Mob_enh BL CR for TS 38.423): Early Data Forwarding for Cho", 3GPP RAN WG3 Meeting #107bis-e, R3-201927, Apr. 20-30, 2020, 1-13.

Ericsson, "CHO in MR-DC operation", 3GPP TSG-RAN WG3 Meeting #107bis-e, R3-202367, Online, Apr. 20-30, 2020, 1-4.

Ericsson, "CHO in MR-DC operation", 3GPP TSG-RAN WG3 Meeting #107bis-e, R3-202780, Online, Apr. 20-30, 2020, 1-4.

Intel Corporation, "Introduction of NR mobility enhancement", 3GPP TSG-RAN WG2 Meeting #109 electronic, R2-2001748, Elbonia, Feb. 24- Mar. 6, 2020, 1-16.

"TP for TS37.340 BLCR Conditional PScell&SCG Management in MR-DC", 3GPP TSG RAN WG3#105bis; R3-195112; Chongqing, China, Oct. 14-18, 2019, 17 pages.

* cited by examiner

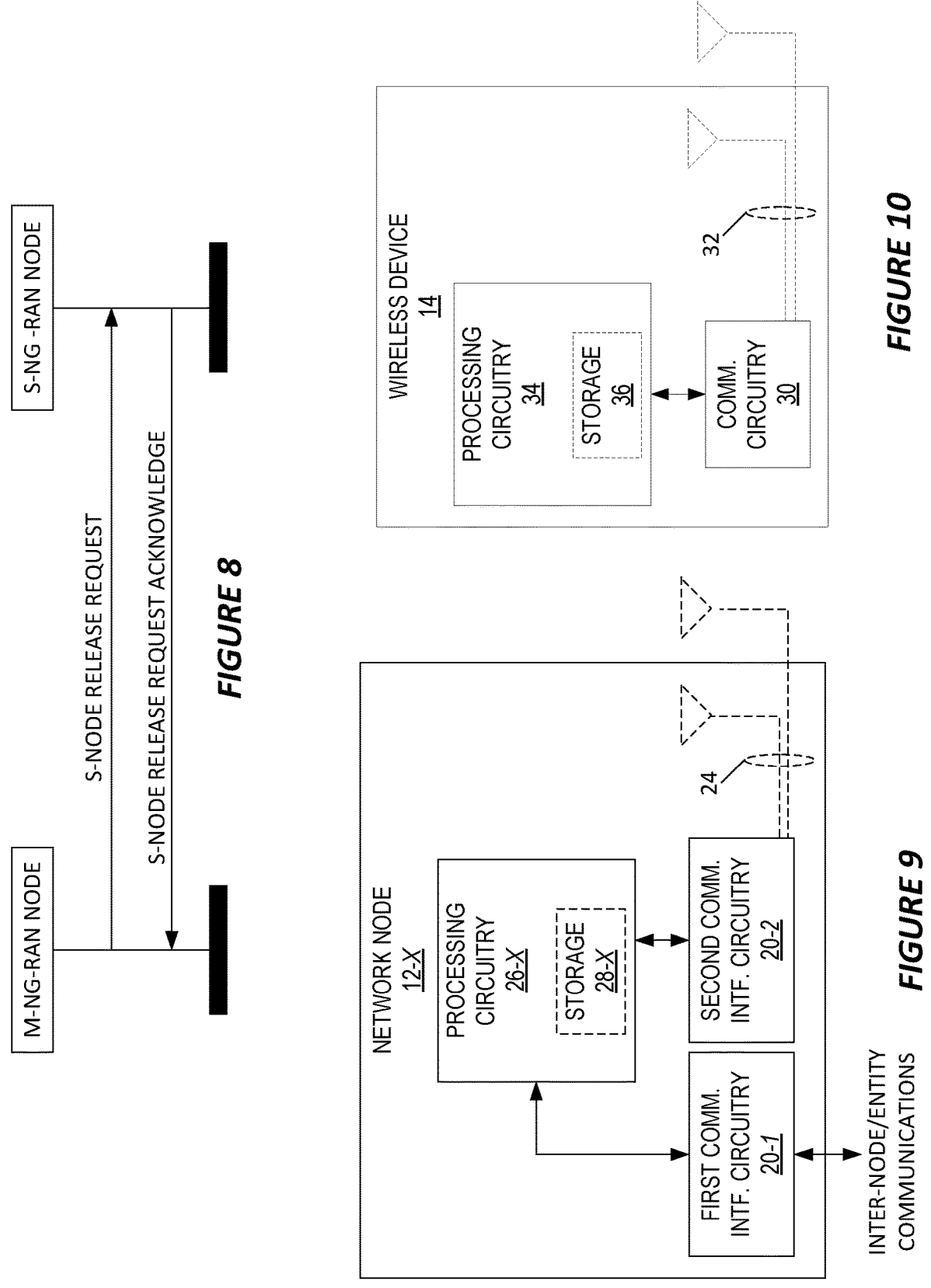

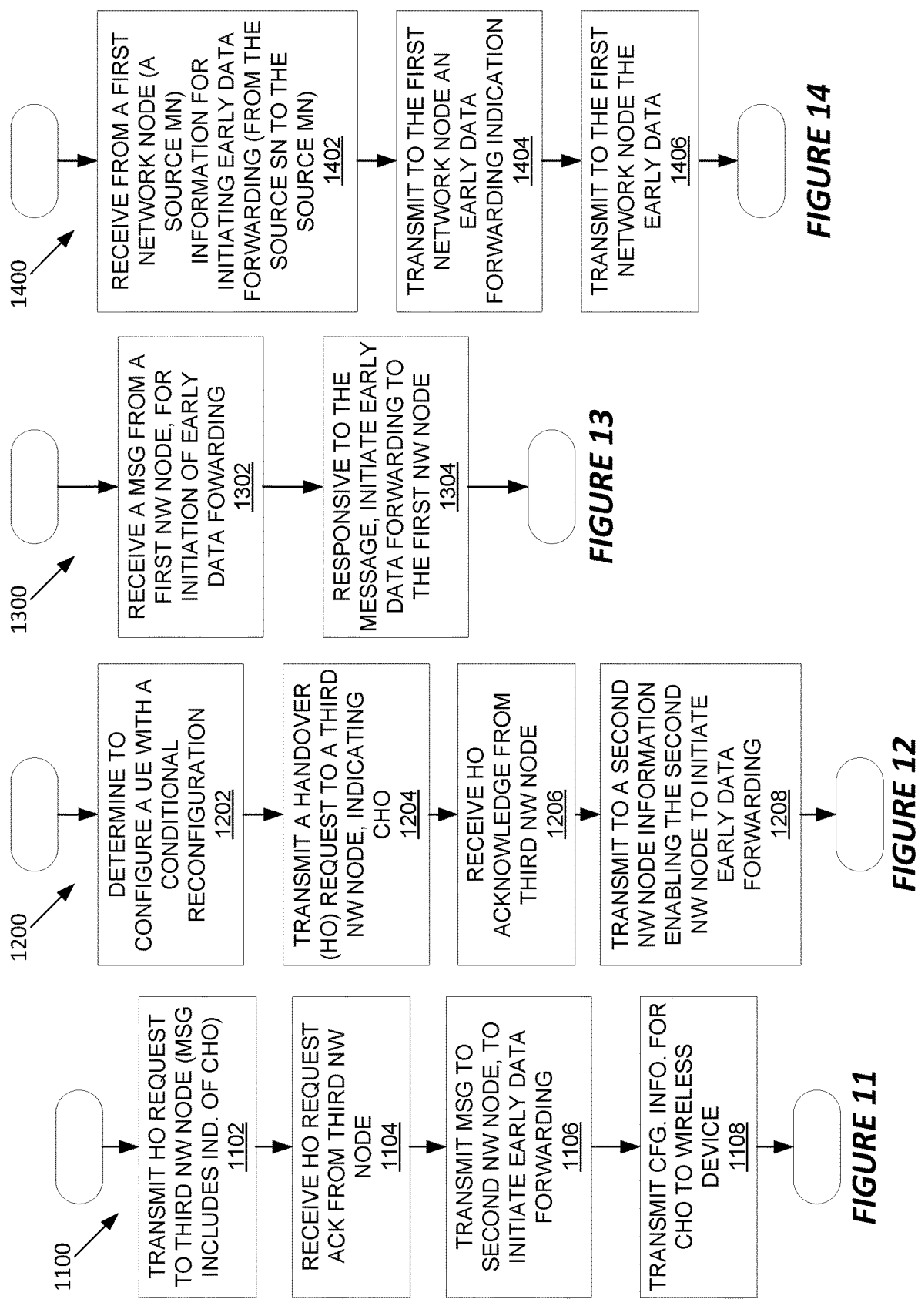

1400

RECEIVE FROM A FIRST NETWORK NODE (A SOURCE MN) INFORMATION FOR INITIATING EARLY DATA FORWARDING (FROM THE SOURCE SN TO THE SOURCE MN) 1402

TRANSMIT TO THE FIRST NETWORK NODE AN EARLY DATA FORWARDING INDICATION 1404

TRANSMIT TO THE FIRST NETWORK NODE THE EARLY DATA 1406

RECEIVE A MSG FROM A FIRST NW NODE, FOR INITIATION OF EARLY DATA FOWARDING 1302

RESPONSIVE TO THE MESSAGE, INITIATE EARLY DATA FORWARDING TO THE FIRST NW NODE 1304

DETERMINE TO CONFIGURE A UE WITH A CONDITIONAL RECONFIGURATION 1202

TRANSMIT A HANDOVER (HO) REQUEST TO A THIRD NW NODE, INDICATING CHO 1204

RECEIVE HO ACKNOWLEDGE FROM THIRD NW NODE 1206

TRANSMIT TO A SECOND NW NODE INFORMATION ENABLING THE SECOND NW NODE TO INITIATE EARLY DATA FORWARDING 1208

TRANSMIT HO REQUEST TO THIRD NW NODE (MSG INCLUDES IND. OF CHO) 1102

RECEIVE HO REQUEST ACK FROM THIRD NW NODE 1104

TRANSMIT MSG TO SECOND NW NODE, TO INITIATE EARLY DATA FORWARDING 1106

TRANSMIT CFG. INFO. FOR CHO TO WIRELESS DEVICE 1108

FIGURE 11

METHODS AND APPARATUSES FOR EARLY DATA FORWARDING IN CONDITIONAL HANDOVER OF A UE IN MULTI-CONNECTIVITY

TECHNICAL FIELD

Aspects of this disclosure relate to early data forwarding in a wireless communications network, in the context of conditional handover of a UE in multi-connectivity.

BACKGROUND

"Mobility" in a wireless communication network may refer to "handover" of a wireless device from one radio access node to another, e.g., such as when the quality of the radio connection between a User Equipment (UE) and a serving radio access node decreases and a neighboring radio access node offers better quality. One issue is that the handover command or other signaling exchanged over the radio link between the UE and its serving node may not be reliable, given the prevailing radio conditions on the radio link.

One solution to improve mobility robustness discussed in the context of Fifth Generation (5G) New Radio (NR) is called "conditional handover" or "early handover command". To avoid the undesired dependence on the serving radio link upon the time (and radio conditions) where the UE should execute the handover, the possibility to provide RRC signaling for the handover to the UE earlier should be provided. To achieve this, it should be possible to associate the HO command with a condition, e.g., based on radio conditions possibly similar to the ones associated with an A3 event, where a given neighbor becomes X dB better than target. As soon as the condition is fulfilled, the UE executes the handover in accordance with the provided handover command.

There currently exist certain challenge(s) with Conditional Handover ("CHO") or other conditional reconfigurations in the context of multi-connectivity, such as in scenarios involving Multi-Radio Dual Connectivity (MR-DC) between the UE and the network.

With conditional reconfiguration, the network transmits a conditional reconfiguration to a UE, also referred to as a "wireless device," and specifies a condition that is to trigger the UE to execute that conditional reconfiguration. The UE waits to execute the conditional reconfiguration until the UE detects that the condition is fulfilled. Once the UE detects fulfillment of the condition, the UE may autonomously execute the conditional reconfiguration without receiving any other signaling, which means that the reconfiguration provides robustness with respect to deteriorating radio-link conditions.

Although this conditional reconfiguration approach can improve robustness against failure, its use proves challenging in some contexts. For example, "multi-connectivity" refers to the simultaneous connection of a wireless device (e.g., at a Radio Resource Control (RRC) layer) to multiple different radio network nodes, or to multiple different cells provided by different radio network nodes. Known approaches to conditional reconfiguration fail to adequately account for the multiplicity of radio network nodes or cells involved in multi-connectivity.

Certain aspects of the present disclosure and their embodiments may provide solutions to these or other challenges. One or more embodiments provide certain technical advantage(s). For example, one or more embodiments disclosed herein enable a source Master Node (MN) in a wireless communication network to perform early data forwarding for a UE that is operating in MR-DC and where the UE is to be configured with a Conditional Reconfiguration, such as CHO.

SUMMARY

Disclosed methods and apparatuses advantageously provide for early data forwarding in conditional handover of a User Equipment (UE) in multi-connectivity scenarios. Early data forwarding includes data from secondary nodes of the multi-connectivity.

One embodiment comprises a method performed by a first network node of a wireless communication network. The method includes the first network node transmitting a handover request to a third network node, the handover request including an indication of conditional handover of a wireless device to the third network node, wherein the first network node and a second network node are in multi-connectivity with the wireless device. The method further includes the first network node receiving a handover request acknowledgment from the third network node, transmitting a message to the second network node, for initiation of early data forwarding from the second network node to the first network node of data associated with the wireless device, and transmitting configuration information for the conditional handover to the wireless device.

A related embodiment comprises a first network node configured for operation in a wireless communication network. The first network node comprises first communication interface circuitry configured for communicatively coupling the first network node to one or more other network nodes and second communication interface circuitry configured for communicatively coupling the first network node to a wireless device. The first network node further comprises processing circuitry that is operatively associated with the first and second communication interface circuitry.

The processing circuitry of the first network node is configured to transmit a handover request to a third network node, the handover request including an indication of conditional handover of the wireless device to the third network node, wherein the first network node and a second network node are in multi-connectivity with the wireless device. Further, the processing circuitry of the first network node is configured to receive a handover request acknowledgment from the third network node, transmit a message to the second network node, for initiation of early data forwarding from the second network node to the first network node of data associated with the wireless device, and transmit configuration information for the conditional handover to the wireless device.

Another embodiment comprises a method performed by a second network node of a wireless communication network. The method comprises the second network node receiving a message from a first network node, for initiation of early data forwarding from the second network node to the first network node, for data associated with a wireless device in multi-connectivity with the first and second network nodes. The method further comprises the second network node initiating, in response to the message, the early data forwarding to the first network node.

A related embodiment comprises a second network node configured for operation in a wireless communication network. The second network node comprises first communication interface circuitry configured for communicatively coupling the second network node to one or more other network nodes and second communication interface circuitry configured for communicatively coupling the second network node to wireless devices. Further, the second network node comprises processing circuitry that is operatively associated with the first and second communication interface circuitry and configured to receive a message from a first network node, for initiation of early data forwarding from the second network node (12-2) to the first network node, for data associated with a wireless device that is in multi-connectivity with the first and second network nodes. The processing circuitry of the second network node is further configured to initiate the early data forwarding to the first network node, in response to the message.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 4-8 are signal flow diagrams of respective embodiments of signaling among first and second or first and third network nodes, for conditional handover and early data forwarding.

FIG. 9 is a block diagram of one embodiment of a network node.

FIG. 10 is a block diagram of one embodiment of a wireless device.

FIG. 11 is a logic flow diagram of one embodiment of a method performed by a first network node.

FIG. 12 is a logic flow diagram of another embodiment of a method performed by a first network node.

FIG. 13 is a logic flow diagram of one embodiment of a method performed by a second network node.

FIG. 14 is a logic flow diagram of another embodiment of a method performed by a second network node.

DETAILED DESCRIPTION

Figure 1:
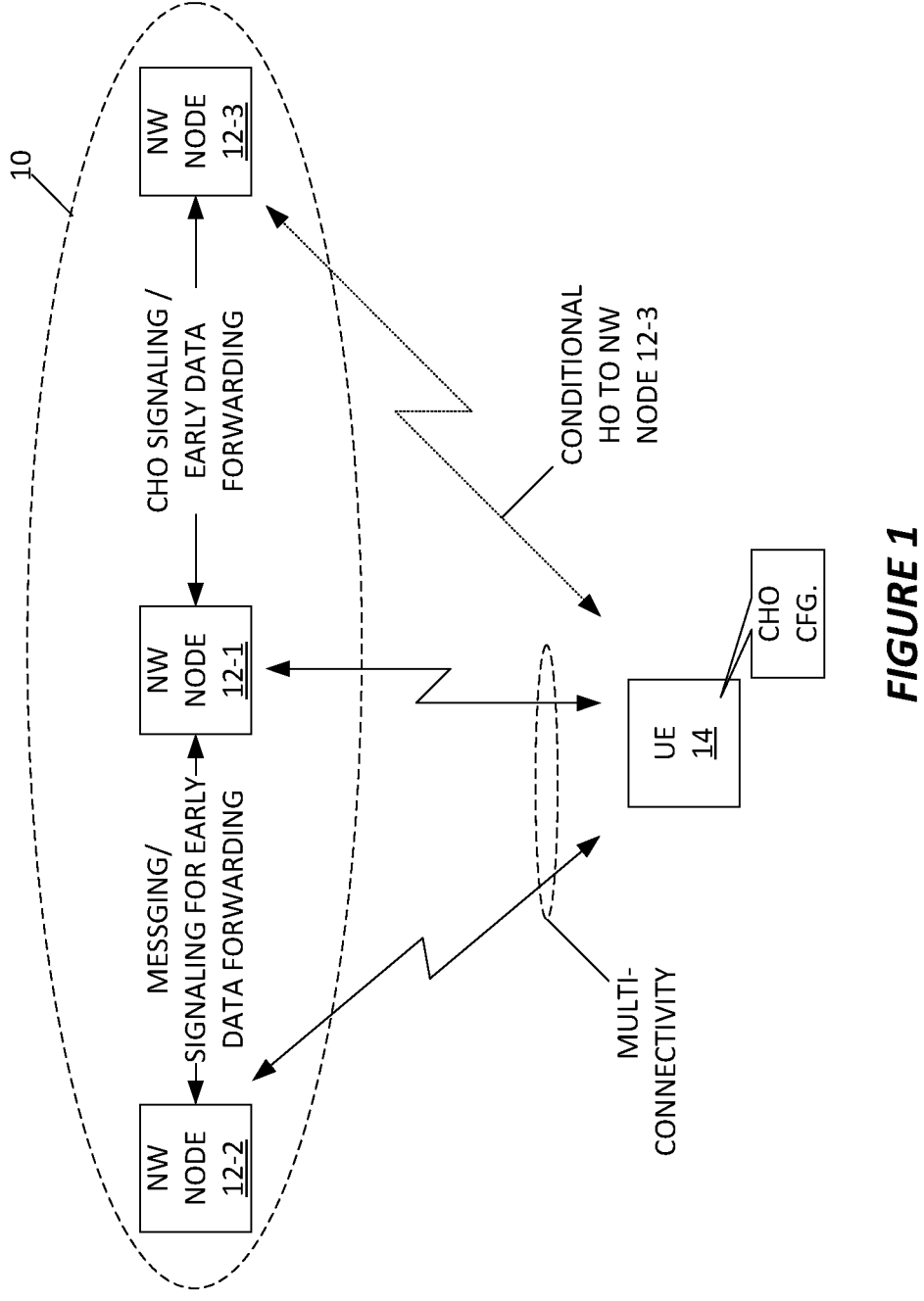
FIG. 1 is a block diagram of one embodiment of a wireless communication network.

FIG. 1 illustrates an example wireless communication network 10 having one or more network nodes 12, where the wireless communication network 10 provides multi-connectivity for a wireless device 14, also referred to as a "User Equipment" or "UE". The wireless device 14 is configured for multi-connectivity operation, where "multi-connectivity" in this regard refers to the simultaneous connection of the wireless device 14 (e.g., at a radio resource control, RRC, layer) to multiple different network nodes 12, or to multiple different cells provided by different network nodes 12. The multiple different network nodes 12 or cells may use the same radio access technology (e.g., they may use Evolved Universal Terrestrial Radio Access (E-UTRA), or they may use New Radio (NR)). Alternatively, the multiple different network nodes 12 or cells may use different radio access technologies, e.g., one may use E-UTRA and another may use NR.

FIG. 1 illustrates three network nodes 12, depicted as "NW Nodes" 12-1, 12-2, and 12-3, where the network nodes 12 may be radio network nodes in a Radio Access Network (RAN) portion of the wireless communications network 10. In the diagram, the wireless device 14, also referred to as the UE 14, is in multi-connectivity with the first network node 12-1 and the second network node 12-2. As such, FIG. 1 illustrates one example of multi-connectivity as Dual Connectivity (DC) in which the wireless device 14 is simultaneously connected to two different network nodes 12, or to two different cells provided by two different network nodes 12. In this case, the wireless device 14 may be configured with a so-called master cell group (MCG) and a secondary cell group (SCG), where the MCG includes one or more cells provided by a network node 12 acting as a master node (MN) and the SCG includes one or more cells served by a network node 12 acting as a secondary node (SN). The master node may be a master in the sense that it controls the secondary node and/or provides the control plane connection to a core network portion of the wireless communications network 10. For example, E-UTRA-NR (EN) DC refers to where the master node uses E-UTRA and the secondary node uses NR, whereas NR-E-UTRA (NE) refers to where the master node uses NR, and the secondary node uses E-UTRA.

In multi-connectivity operation, a wireless device 14 with multiple receivers (Rx) and/or transmitters (Tx) may utilize radio resources amongst one or more radio access technologies (e.g., New Radio, NR, and/or E-UTRA) provided by multiple distinct schedulers connected via a non-ideal backhaul. Multi-radio dual connectivity (MR-DC) in this regard is a generalization of Intra-E-UTRA DC, where a multiple Rx/Tx wireless device may be configured to utilize resources provided by two different network nodes 12 connected via a non-ideal backhaul, one providing NR access and the other one providing either E-UTRA or NR access. One network node 12 acts as the MN and the other network node 12 acts as an SN. E-UTRAN, for example, supports MR-DC via E-UTRA-NR dual connectivity (EN-DC), in which a wireless device is connected to one eNB that acts as a MN and one en-gNB that acts as a secondary node (SN). Either way, in MR-DC, a wireless device 14 may have a single Radio Resource Control (RRC) state, based on the MN RRC and a single control plane connection towards the core network.

In the example of FIG. 1, the first network node 12-1 may be understood as operating as a Source MN (S-MN) for the multi-connectivity with the wireless device 14. Correspondingly, the second network node 12-2 operates as a Source SN (S-SN) for the multi-connectivity. At some point during multi-connectivity operation, the first network node 12-1 decides to configure the wireless device 14 for Conditional Handover (CHO) to a third network node 12-3. The third network node 12-3 is a candidate for selection as a new source node for the wireless device 14, and it may be one among two or more other network nodes 12 that are identified as prospective candidates for handover of the wireless device 14.

Advantageously, the first and second network nodes 12-1 and 12-2 are configured to support early data forwarding in the context of CHO of a wireless device 14 in multi-connectivity with the first and second network nodes 12-1 and 12-2. In particular, early data forwarding encompasses the data handled at the second network node 12-2 for the multi-connectivity with the wireless device 14 and the data handled at the first network node 12-1 for the multi-connectivity with the wireless device 14.

The "MESSAGING/SIGNALING FOR EARLY DATA FORWARDING" depicted in FIG. 1 represents the control signaling and data communications between the first and second network nodes 12-1 and 12-2 in support of the early data forwarding. The "CHO SIGNALING/EARLY DATA FORWARDING" depicted in the figure represents the control signaling and data communications between the first and third network nodes 12-1 and 12-3 in support of the conditional handover and early data forwarding.

To appreciate the advantages of the contemplated arrangement for early data forwarding, consider that with early data forwarding in the context of CHO, the wireless device 14 does not execute the handover to the network node 12 targeted as the new serving node for the wireless device 14 unless/until the configured condition(s) are fulfilled. Thus, the current serving network node 12 of the wireless device 12 does not know whether or when the wireless device 14 will execute the handover and, therefore, to avoid possible data interruptions to the wireless device 14, the current serving network node 12 can begin forwarding data for the wireless device 14 to the target network node 12 (in addition to transmitting the same data to the wireless device 14). See Section 9.2.3.4 of the Third Generation Partnership Project (3GPP) Technical Specification (TS) 38.300 V16.5.0, regarding conditional handover and early data forwarding from a single serving network node.

Figure 2:
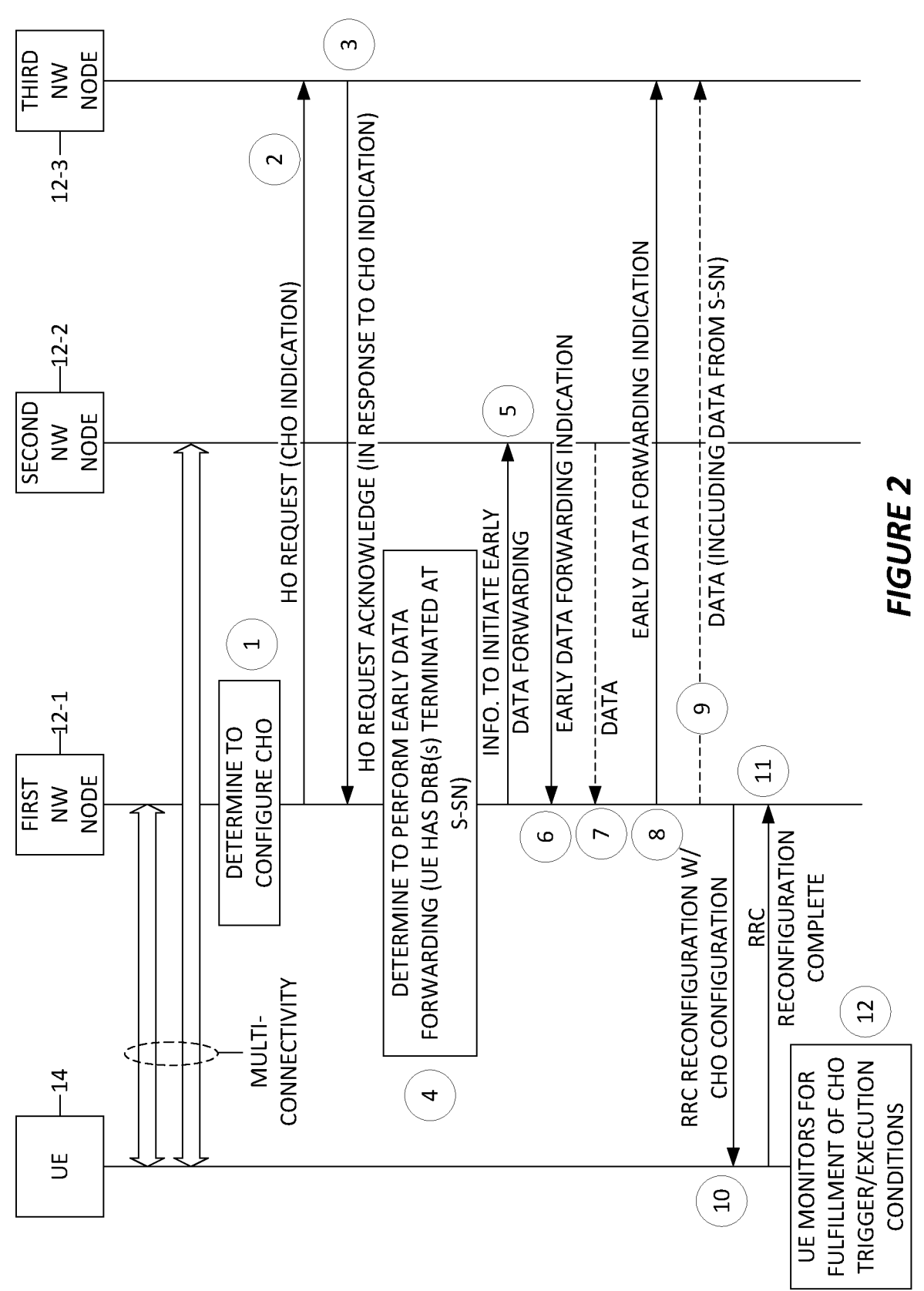
FIG. 2 is a signal flow diagram of one embodiment of signaling among first, second, and third network nodes, for early data forwarding in conditional handover of a User Equipment (UE) in a multi-connectivity scenario.

As a significant complication, however, with multi-connectivity, there is more than one serving network node 12 and, generally, data for the wireless device 14 at more than one serving network node 12. Advantageously, the techniques disclosed herein provide for early data forwarding in the context of CHO with multi-connectivity, where the early data forwarding pulls in or otherwise includes data for the involved wireless device 14 that is handled by all of the network nodes 12 that in the multi-connectivity. FIG. 2 offers one example of advantageous signaling and supporting operations, for early data forwarding in the context of CHO with multi-connectivity.

Specifically, FIG. 2 depicts an example signaling flow between first, second, and third network nodes 12-1, 12-2, and 12-3, according to one or more embodiments, along with signaling exchanged with the wireless device 14, which is shown as "UE" 14 in the diagram. The signaling and the operations supporting the signaling advantageously address, among other things, the case of a wireless device 14 operating in MR-DC and a source network node 12 involved in the multi-connectivity that wants to configure Conditional Handover or CHO (also called conditional reconfiguration) of the wireless device 14, with early data forwarding. Here, the early data forwarding refers to data forwarding that starts before the CHO execution. The technique(s) disclosed herein to provide for early data forwarding in the context of multi-connectivity operation comprise various actions between the involved network nodes 12, to enable early data the forwarding in the scenario of CHO during multi-connectivity.

In the context of FIG. 2, a first network node 12-1 performs CHO preparation with respect to a wireless device 14. The first network node 12-1 and a second network node 12-2 are in multi-connectivity with the wireless device 14, and the first network node 12-1 determines to configure the wireless device 14 with a conditional reconfiguration (Item 1, "DETERMINE TO CONFIGURE CHO"), shown here as a CHO with respect to a third network node 12-3. As a particular example, the multi-connectivity is MR-DC with the first network node 12-1 as the S-MN and the second network node 12-2 as the S-SN.

The first network node 12-1 transmits a handover request to the third network node 12-3, as target candidate node, e.g., a target gNodeB (Item 2, "HO REQUEST (CHO INDICATION)"). The handover request includes an indication that the procedure is for CHO and the first network node 12-1 receives a handover request acknowledgment from the third network node 12-3 (Item 3, "HO REQUEST ACKNOWLEDGE (IN RESPONSE TO CHO INDICATION"), sent in response to the request.

At Item 4, the first network node 12-1 determines that early data forwarding will be performed and in this example scenario there are Data Radio Bearers (DRBs) terminated at the second network node 12-2 for the multi-connectivity, with the data associated with those DRBs to be include in the early forwarding. "S-SN" in Item 4 refers to the second network node 12-2 operating as a Source Secondary Node or S-SN.

Correspondingly, the first network node 12-1 performs early data forwarding procedures with the second network node 12-2. In the illustrated example, the first network node 12-1 sends information to the second network node 12-2, to initiate the early data forwarding (Item 5, "INFO. TO INITIATE EARLY DATA FORWARDING"). For example, the first network node 12-1 may initiate an address indication procedure with the second network node 12-2, in response to reception of the handover request acknowledgment from the third network node 12-3.

Here, it may be helpful to review a couple of key points regarding the early data forwarding. With the wireless device 14 being in multi-connectivity with the first and second network nodes 12-1 and 12-2, some data associated with the wireless device 14 is handled at the first network node 12-1—e.g., downlink data for the wireless device 14 to be transmitted on a bearer that is terminated at the first network node 12-1—and some data associated with the wireless device is handled at the second network node 12-2—e.g., downlink data for the wireless device 14 to be transmitted on a bearer that is terminated at the first network node 12-1.

Hence, early data forwarding to the third network node 12-3 in advance of execution of the CHO by the wireless device 14 is significantly more complicated than it would be if the wireless device 14 had only a single connection to the first network node 12-1. By sending information from the first network node 12-1 to the second network node 12-2, to initiate early data forwarding by the second network node 12-2 for the involved data, the first network node 12-1 is able to forward early data to the third network node 12-3 not only for the data that it handles for the wireless device 14 in the multi-connectivity but also for the data that the second network node 12-2 handles for the wireless device 14 in the multi-connectivity.

Turning back to FIG. 2, after the first network node 12-1 sends the information to the second network node 12-2 to initiate the early data forwarding, it receives from the second network node 12-2 an early data forwarding indication (Item 6, "EARLY DATA FORWARDING INDICATION") and may receive early forwarding data from the second network node 12-2 (Item 7, "DATA"). The first network node 12-1 sends an indication of early data forwarding to the third network node 12-3 (Item 8, "EARLY DATA FORWARD-ING INDICATION") and begins sending early data to the third network node 12-3 (Item 9, "DATA (INCLUDING DATA FROM S-SN)"). The first network node 12-1 also sends an RRC reconfiguration message to the wireless device 14, with the CHO configuration (Item 10, "RRC RECONFIGURATION W/CHO CONFIGURATION"). The wireless device 14 responds with an RRC reconfiguration complete message (Item 11, "RRC RECONFIGURATION COMPLETE") and monitors for fulfillment of the CHO trigger/execution conditions (Item 12).

The early data subject to early data forwarding from the first network node 12-1 to the third network node 12-3 includes, for example, data for the wireless device 14 that corresponds to Data Radio Bearers (DRBs) that are termi-nated at the first network node 12-1 for the multi-connec-tivity, and data for the wireless device 14 that corresponds to DRBs that are terminated at the second network node 12-2 for the multi-connectivity. Such data is early-forwarded from the second network node 12-2 to the first network node 12-1, which then forwards it to the third network node 12-3.

Figure 3:
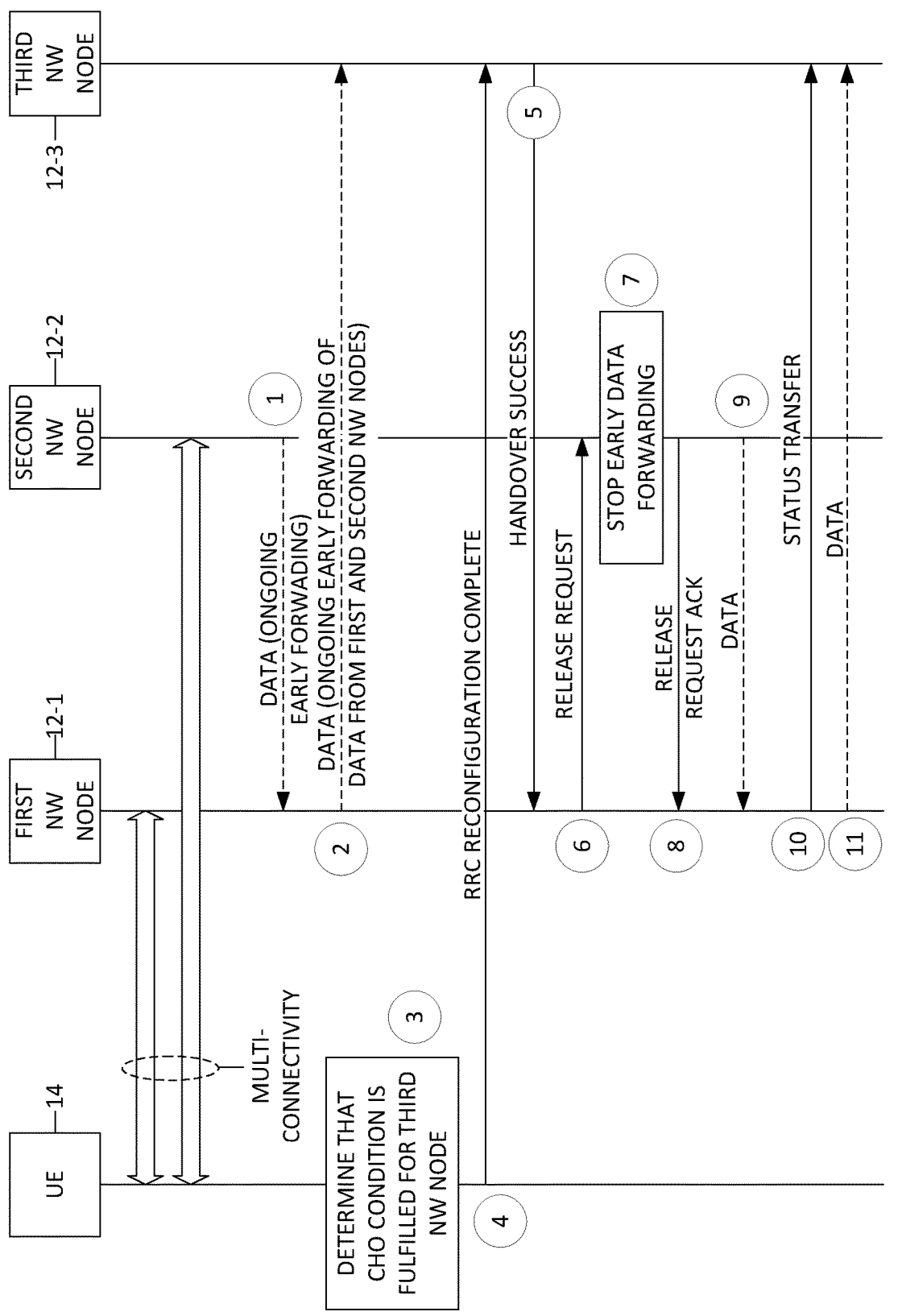
FIG. 3 is a signal flow diagram of one embodiment of signaling among first, second, and third network nodes, for terminating early data forwarding.

FIG. 3 can be understood as a continuation of FIG. 2 or as depicting an example signal flow in the context of ongoing early data forwarding, as established in the manner shown in FIG. 2. As such, early data forwarding is ongoing from the second network node 12-2 to the first network node 12-1 (Item 1, "DATA (ONGOING EARLY FORWARD-ING)"). Correspondingly, early data forwarding is ongoing from the first network node 12-1 to the third network node 12-3, with the early data including early data forwarded from the second network node 12-2 to the first network node 12-1 (Item 2, "DATA (ONGOING EARLY FORWARDING OF DATA FROM FIRST AND SECOND NW NODES)").

At Item 3, the wireless device 14 (shown as "UE 14" in the diagram) determines that the trigger/execution condi-tions for the CHO to the third network node 12-3 are fulfilled. See Items 10-12 in FIG. 2, where the first network node 12-1 configured the CHO, including configuring or otherwise indicating the trigger/execution conditions.

Responsive to determining that the trigger/execution con-ditions for the CHO to the third network node 12-3 are fulfilled, the wireless device 14 sends an RRC reconfigura-tion complete message to the third network node 12-3 (Item 4, "RRC RECONFIGURATION COMPLETE") and the third network node 12-3 sends a handover success message to the first network node 12-1 (Item 5, "HANDOVER SUCCESS"). That message indicates execution of the CHO by the wireless device 14 to the third network node 12-3. The first network node 12-1 then sends a release request to the second network node 12-2 (Item 6, "RELEASE REQUEST"), requesting release of the bearers terminated at the second network node 12-2 for the multi-connectivity with the wireless device 14. The second network node 12-2 responds to the request by releasing the bearers, terminating the early data forwarding and acknowledging the release to the first network node 12-1 (all shown as Item 7, "STOP EARLY DATA FORWARDING").

The second network node 12-2 sends an acknowledge-ment of the release request (Item 8, "RELEASE REQUEST ACK") back to the first network node 12-1 and forwards any data for the wireless device 14 (Item 9, "DATA"). The first network node 12-1 then sends status transfer signaling to the third network node 12-3 (Item 10, "STATUS TRANSFER") and performs late data forwarding towards the third network node 12-3 (Item 11, "DATA").

In the context of FIGS. 2 and 3, the first network node 12-1 may be a M-SN, such as a Source Master gNB (MgNB), the second network 12-2 may be a S-SN, such as a Source Secondary gNB (SgNB), and the third network node 12-3 may be target gNB that is a candidate for serving as a new source node for the wireless device 14.

The depicted operations enable a source MN to perform early data forwarding for a UE operating in MR-DC, for a UE to be configured with Conditional Reconfiguration (e.g., Conditional Handover—CHO). In other words, a Source MN is able to request CHO for target candidates, and initiate early data forwarding from the Source SN to the source MN, for SN terminated bearers, enabling each target candidate to receive early data for a possibly incoming UE having SN terminated bearers.

Such an arrangement increases data rates to the wireless device 14, as it may continue to operate in MR-DC and, at the same time, have the possibility to improve its robustness via the configured CHO. Particularly owing to the early data forwarding, the depicted operations allow a wireless device 14 that is configured with SN-terminated bearers to be configured with CHO, and still benefit from early data forwarding for data handled for the wireless device 14 at the MN and any SNs involved in the multi-connectivity, thus reducing the interruption time during CHO. Data forwarding as described may provide for a lossless CHO.

An example embodiment includes a first network node 12-1 operating as Source MN, the Source MN comprises processing circuitry and first communication interface cir-cuitry configured for communicatively coupling the Source MN to one or more other network nodes, e.g., a second network node 12-2 operating as the Source SN and to another radio network node that is a handover target for a UE that is operating in MR-DC with respect to the Source MN and the Source SN. The Source MN in one or more embodi-ments further comprises second communication interface circuitry, e.g., radiofrequency transmit and receive circuitry, for communicating with the UE via one or more Radio Access Technologies (RATs). Such circuitry provides the "air interface" for conveying downlink signaling to the UE and receiving uplink signaling from the UE.

The Source MN in one or more embodiments further comprises storage, e.g., a mix of volatile and non-volatile memory circuits and/or other types of storage devices, including any one or more of SRAM, DRAM, NVRAM, FLASH, EEPROM, Solid State Disk (SSD), magnetic disk, etc. Broadly, the Source MN in one or more embodiments comprises one or more types of computer-readable media and the processing circuitry of the Source MN comprises one or more microprocessors or other digital processing circuitry that is configured (specially adapted) to carry out the operations as described herein based at least in part on executing program instructions of one or more computer programs stored in the storage. More broadly, the processing circuitry is fixed or dedicated circuitry, or programmatically-configured circuitry, or any mix thereof.

In one or more embodiments, the Source MN initiates an address indication procedure with the second network node (the Source SN) upon reception of the HANDOVER REQUEST ACKNOWLEDGE message, if early data forwarding is determined to be performed.

The Source MN may receive an early data forwarding indication from the second network node operating as Source Secondary Node SN (i.e., from the S-SN)). In the same or other embodiments, the Source MN may receive from the second network node operating as Source Secondary Node SN (i.e., from the S-SN)) forwarded data of a first type. For example, the "forwarded data of a first type" corresponds to data forwarded from the Source SN, associated to SN terminated bearers.

In one or more embodiments, the Source MN transmits to the third network node (which is a target candidate e.g., a target gNodeB) an early data forward indication. In the same or other embodiment(s), the Source MN transmits to the third network node (which is a target candidate e.g., a target gNodeB) the forwarded data. Here, the "forwarded data" refers to data forwarded from the Source SN, associated with the SN terminated bearers.

Regarding the above details, saying that the processing circuitry of the Source MN is configured to "transmit" or to "receive," for example, refers in one or more embodiments to the processing circuitry being operative to send or receive messages or other signaling via communication interface circuitry of the Source MN. Further, to the extent that the Source MN is virtualized or otherwise implemented in a distributed fashion, saying that the processing circuitry of the Source MN is configured to "send" or "receive" shall be understood to mean that the processing circuitry is configured to send signaling to and/or receive signaling from other entities that are at least functionally external to the processing circuitry and the nature of such signaling depends on the circuit configurations and medium/media interconnecting the processing circuitry with the external entities. The same or similar understandings apply regarding an example Source SN.

At a second network node 12-2 operating as the Source SN, the Source SN comprises processing circuitry and first communication interface circuitry configured for communicatively coupling the Source SN to one or more other network nodes, e.g., another radio network node operating as the Source MN. The Source SN in one or more embodiments further comprises second communication interface circuitry, e.g., radiofrequency transmit and receive circuitry, for communicating with the UE via one or more Radio Access Technologies (RATs). Such circuitry provides the "air interface" for conveying downlink signaling to the UE and receiving uplink signaling from the UE.

The Source SN in one or more embodiments further comprises storage, e.g., a mix of volatile and non-volatile memory circuits and/or other types of storage devices, including any one or more of SRAM, DRAM, NVRAM, FLASH, EEPROM, Solid State Disk (SSD), magnetic disk, etc. Broadly, the Source SN in one or more embodiments comprises one or more types of computer-readable media and the processing circuitry of the Source MN comprises one or more microprocessors or other digital processing circuitry that is configured (specially adapted) to carry out the operations as described herein based at least in part on executing program instructions of one or more computer programs stored in the storage. More broadly, the processing circuitry is fixed or dedicated circuitry, or programmatically-configured circuitry, or any mix thereof.

With the above in mind, various solutions in this disclosure involve scenarios where a UE is configured with Multi-Radio Dual Connectivity (MR-DC) when it receives a conditional handover (CHO) configuration. Certain embodiments described herein are focused on NR-DC (i.e., when both master and secondary node are NR gNBs), but the solutions are equally applicable to other DC scenarios (e.g., NE-DC, (NG)EN-DC and LTE DC).

By way of example, three methods for three respective nodes in a mobile network are considered, including a first network node 12-1, a second network node 12-2, and a third network node 12-3. Possible correspondences are:

First network node 12-1: may correspond to (e.g., operate as) a Source Master Node (MN), S-MN, Source gNodeB, source eNodeB, Source NG-RAN node, an M-NG-RAN node indicating a gNodeB (e.g., connected to 5GC) operating in MR-DC as an MN, and associated to NG-RAN; an M-NG-RAN node indicating an ng-eNodeB (e.g., connected to 5GC) operating in MR-DC as an MN, and associated to NG-RAN; an LTE eNodeB connected to EPC operating a MeNodeB or MeNB Second network node 12-2: may correspond (e.g., operate as) to a Source Secondary Node (SN), S-SN, Source Secondary gNodeB (SgNB), source Secondary eNodeB (SeNB), Secondary Source NG-RAN node, etc.

Third network node 12-3: may correspond to (e.g. operate as) a target candidate node, candidate target node, target MN (T-MN), target node, target candidate gNodeB, target candidate eNodeB, target candidate NG-RAN node, candidate target gNodeB, candidate target eNodeB, candidate target NG-RAN node, target gNodeB, target eNodeB, target NG-RAN node; A target candidate NG-RAN node indicating a gNodeB (e.g. connected to 5GC) associated to NG-RAN; A target candidate NG-RAN node indicating an ng-eNodeB (e.g. connected to 5GC) associated to NG-RAN; A target candidate LTE eNodeB connected to EPC, possibly a target candidate MeNodeB or target candidate MeNB.

The terms target, target node, target candidate node, target candidate, candidate target node should be interpreted as synonyms, unless explicitly said otherwise.

In an EN-DC configuration, for example, the first network node 12-1 corresponds to a Source eNodeB (S-eNB), the second network node 12-2 corresponds to an NR gNodeB operating as Secondary S-gNodeB (SgNB), and the third or target node 12-3 corresponds to a Target eNodeB.

In an NR-DC configuration, for example, the first network node 12-1 corresponds to a Source gNodeB (S-gNB), the second network node 12-2 corresponds to an NR gNodeB operating as Secondary S-gNodeB (SgNB), and the third or target network node 12-3 corresponds to a Target gNodeB.

The term Conditional Handover or CHO appears frequently herein. However, other terms may be considered as synonyms such as conditional reconfiguration, or Conditional Configuration (because the message that is stored and applied upon fulfillment of a condition is an RRCReconfiguration or RRCConnectionReconfiguration). Broadly, a CHO is a conditional reconfiguration with configuring triggering/execution condition(s) and a reconfiguration message to be applied when the triggering condition(s) are fulfilled.

The procedures described herein have as one example the case where a UE operating in MR-DC is being configured with CHO. Then, upon receiving a HO Request Ack message a source MN requests the Source SN to initiate early data forwarding (e.g., using the Xn-U Address Indication message), such as in case the UE is configured with SN terminated bearers. However, the method is also applicable in the case the UE is configured with CHO and the network (e.g., source MN) determines to add an SN terminated bearer. In that case, the early data forwarding request can be sent after the SN addition is finalized.

An example method for CHO preparation performed at a first network node 12-1 operating as Source MN comprises:

Determination to configure a UE with a conditional reconfiguration (e.g., Conditional Handover—CHO), wherein the UE is operating in MR-DC with the first network node as Master Node (e.g., Source MN, S-MN);

The determination may be based on measurement reports received from the UE at the Source MN, including measurements for cells associated with neighbor nodes (e.g., neighbor gNodeB(s)) that may be target candidate nodes for CHO;

Transmitting a HANDOVER REQUEST message to a third network node 12-3 (which is a target candidate node, e.g., a target gNodeB) including an indication that the procedure is for CHO;

In one embodiment the MN transmitting a HANDOVER REQUEST message to a single target candidate including an indication that the procedure is for CHO;

For example, a target candidate may have one target cell candidate associated to it.

In one embodiment the MN transmitting HANDOVER REQUEST messages to a single target candidate including an indication that the procedure is for CHO;

For example, a target candidate may have multiple target cells candidates associated with it. In that case there may be one HANDOVER REQUEST message transmitted for each target cell candidate.

In one embodiment the MN transmitting HANDOVER REQUEST messages to multiple target candidates including an indication that the procedure is for CHO;

For example, a target candidate may have multiple target cells candidates associated with it. In that case there may be one HANDOVER REQUEST message transmitted for each target cell candidate. And there may be multiple candidate cells in different target candidate nodes.

Receiving a HANDOVER REQUEST ACKNOWL-EDGE message from the third network node 12-3 (which is a target candidate node, e.g., a target gNodeB)

In one embodiment the MN receiving one HANDOVER REQUEST ACKNOWLEDGE from a single target candidate;

For example, a target candidate may have one target cell candidate associated with it.

In one embodiment the MN receiving HANDOVER REQUEST ACKNOWLEDGE messages from a single target candidate node;

For example, a target candidate may have multiple target cells candidates associated with it. In that case there may be one HANDOVER REQUEST ACKNOWLEDGE message received for each target cell candidate.

In one embodiment the MN receiving HANDOVER REQUEST ACKNOWLEDGE messages from multiple target candidates;

For example, a target candidate may have multiple target cells candidates associated with it. In that case there may be one HANDOVER REQUEST ACKNOWLEDGE message received for each target cell candidate. There may be multiple candidate cells in different target candidate nodes.

Early data forwarding steps involving Source SN

Transmitting to the second network node operating as Source Secondary Node SN (i.e., to the S-SN) information necessary enabling the second network node to initiate early data forwarding (from Source SN to Source MN);

Additional operations may include any one or more of:

determining that early data forwarding is to be performed; and determining if the UE is configured with SN terminated bearers; and performing early data forwarding procedures with the second network node 12-2, operating as Source Secondary Node (S-SN), if the UE is configured with SN terminated bearers.

The first network node 12-1 (e.g., Source MN) may initiate an address indication procedure with the second network node 12-2 upon reception of the HANDOVER REQUEST ACKNOWLEDGE message, if early data forwarding is determined to be performed.

In one or more embodiments, the "information necessary for initiating early data forwarding (from Source SN to Source MN)" corresponds to information transmitted in the address indication procedure.

In at least one embodiment, the "information necessary for initiating early data forwarding (from Source SN to Source MN)" is a request for the second network node 12-2 (Source SN) to initiate Early Data Forwarding. The request may be accepted and in that case the second network node 12-2 (Source SN) transmits an Early Forwarding Transfer message. Alternatively, the second network node 12-2 may reject and transmit a message indicating the rejection to perform early data forwarding. The second network node 12-2 may reject the Early Data Forwarding request by transmitting "Error Indication" message to the first network node 12-1.

In one or more embodiments, the address indication procedure is an XN-U Address Indication procedure, as defined in TS 38.423 V16.5.0 (e.g., in sub-clause 8.2.6). In an example implementation, in case early data forwarding is applied to SN-terminated bearers, the Xn-U Address Indication can be used to trigger the start of data forwarding for SN-terminated bearers, together with the sending of an EARLY FORWARDING TRANSFER message from S-SN to S-MN.

The Xn-U Address Indication contains, for example, an indication indicating that the procedure is for a conditional handover. See, for example, the CHO MR-DC Indicator described in TS 38.423. In the same or in another example, the Xn-U Address Indication contains an indication indicating that the procedure is associated with early data forwarding.

The Xn-U Address Indication may be triggered in parallel with an SN Release Request containing an indication indicating that the procedure is for CHO and/or early data forwarding and/or early data forwarding for CHO.

In at least one embodiment, the first network node 12-1 corresponds to an M-NG-RAN node. Further, in at least one embodiment, the first network node 12-1 indicates to the second network node 12-2 (operating as Source SN) its own forwarding address (or addresses) during the address indication procedure. In a particular example, the first network node 12-1 (e.g., M-NG-RAN node) transmits an XN-U ADDRESS INDICATION message.

Figures 4, 5, 6, 7:
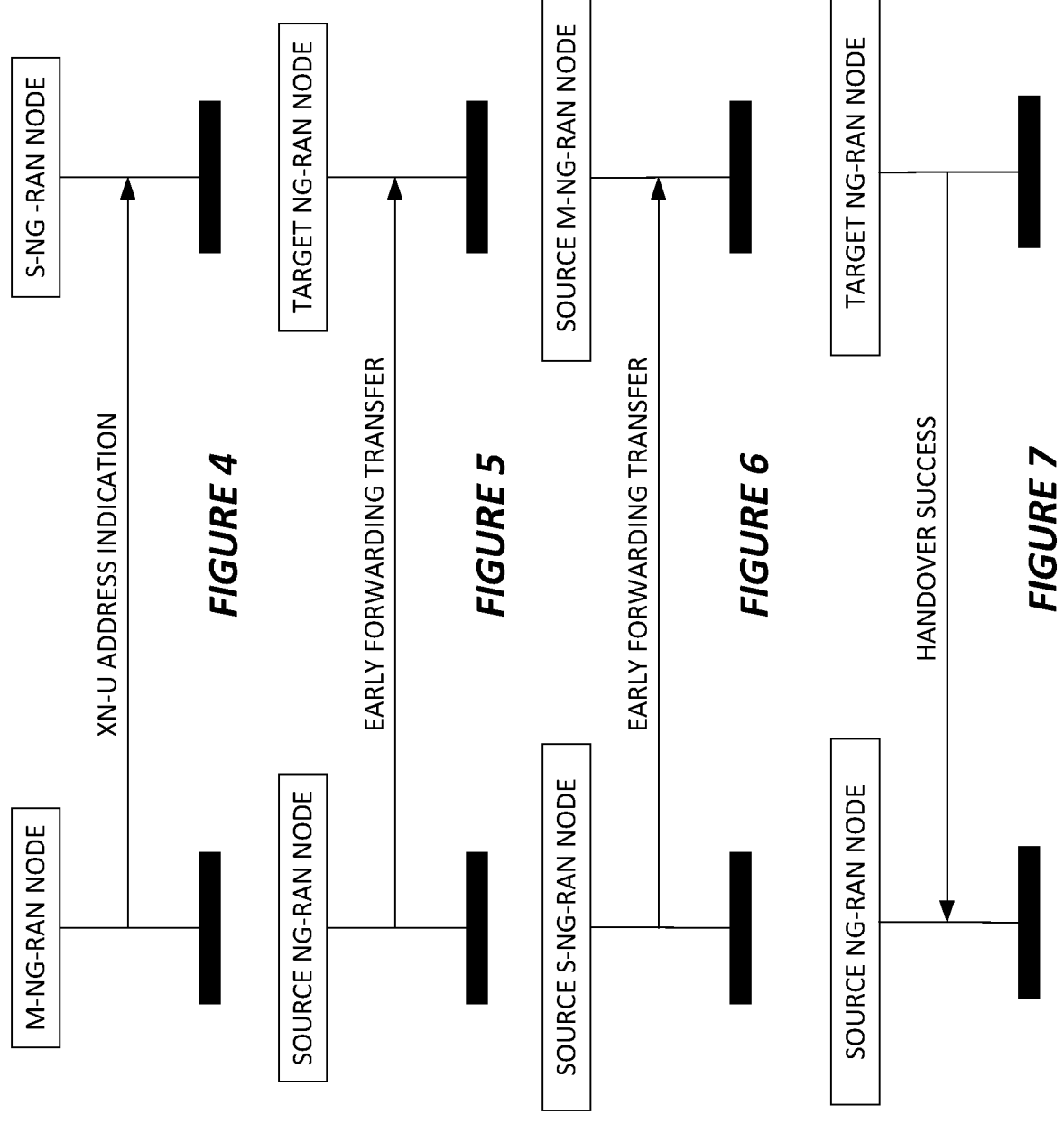

For MR-DC with 5GC, the Xn-U Address Indication procedure is used to provide forwarding addresses and Xn-U bearer address information for completion of setup of SN terminated bearers from the M-NG-RAN node to the S-NG-RAN node as specified in 3GPP TS 37.340 V16.5.0. FIG. 4 depicts signaling between an M-NG-RAN node and an S-NG-RAN node for Xn-U address Indication, for MR-DC with 5GC.

The Xn-U Address Indication procedure is initiated by the M-NG-RAN node. Upon reception of the XN-U ADDRESS INDICATION message, in case of data forwarding, the S-NG-RAN node should forward pending downlink (DL) user data to the indicated TNL addresses; in case of completion of Xn-U bearer establishment for SN terminated bearers, the S-NG-RAN node may start delivery of user data to the indicated TNL address. If the XN-U ADDRESS INDICATION message includes the DRB IDs taken into use IE, the S-NG-RAN node shall, if applicable, act as specified in TS 37.340 V16.5.0.

In the context of CHO with early data forwarding and SN-terminated bearers, the Xn-U Address Indication procedure is initiated by the M-NG-RAN node. If the early data forwarding indicator IE or the Conditional Handover Information IE is included in the XN-U ADDRESS INDICATION message, the S-NG-RAN node should forward pending DL user data to the indicated TNL addresses while continuing sending DL user data to the UE.

The XN-U ADDRESS INDICATION message to be transmitted from the Source MN (M-NG-RAN node) to the Source SN (S-NG-RAN node) may contain or otherwise indicate CHO information and/or include and early data forwarding indicator. In one or more embodiments, the message is sent by an M-NG-RAN node to provide either data forwarding or Xn-U bearer address information for SN terminated bearers, to the S-NG-RAN node. Before the reception of the Xn-U Address Indication the S-SN cannot transmit packets to the S-MN, e.g., in case packets come from the User Plane Function (UPF) to the S-SN, for SN-terminated bearers. Hence, thanks to the GTP-U tunnel endpoints present in Xn-U Address Indication the S-SN can perform data forwarding to the S-MN. Late data forwarding is performed upon the CHO execution, i.e., after the S-MN receives the HANDOVER SUCCESS message.

One or more embodiments include at least one of the first network node 12-1: receiving an SN Status Transfer from the second network node 12-2 operating as Source SN during CHO preparation; and transmitting an SN Status Transfer to the third network node 12-3 (e.g., target candidate node, target gNodeB) during CHO preparation.

Further, the operations may include delaying the transmission of the SN RELEASE REQUEST message to the second network node 12-2 operating as Source Secondary Node SN (S-SN)). Delaying that signaling corresponds to the fact that the CHO is still in the preparation phase. When the CHO is executed, the Source SN needs to be released, or it needs to be indicated that the SN is to be kept, in case the target candidate MN indicated in the HO request acknowledge that the SN was to be kept upon CHO execution.

Thus, in one or more embodiments, method operations at a first network node 12-1 acting as an S-MN or such with respect to multi-connectivity with a wireless device 14 include the first network node 12-1 delaying to trigger (i.e., refraining to initiate, refraining to start) an SN release procedure e.g., upon reception of the HANDOVER REQUEST ACKNOWLEDGE from a third network node 12-3 that is a target for the CHO. The SN release procedure may correspond to an MeNB initiated SgNB Release procedure as defined in TS 36.423, sub-clause 8.7.9, e.g., in the case the MN is an LTE node, and the SN is an NR node (for a UE operating in EN-DC). The SN release procedure may correspond to an M-NG-RAN node initiated S-NG-RAN node Release procedure as defined in TS 38.423 V16.5.0, sub-clause 8.3.6, e.g., in the case the MN is an NR node, and the SN is an NR node (for a UE operating in NR-DC).

The SN RELEASE REQUEST message, when it is sent by an M-SN to an S-SN, may correspond to an SGNB RELEASE REQUEST message as defined in TS 36.423 V16.5.0, e.g., in the case the MN is an LTE node, and the SN is an NR node (for a UE operating in EN-DC). The SN RELEASE REQUEST message may correspond to an S-NODE RELEASE REQUEST message as defined in TS 38.423 V16.5.0, e.g., in the case the MN is an NR node, and the SN is an NR node (for a UE operating in NR-DC).

In one or more embodiments, if the HANDOVER REQUEST ACKNOWLEDGE has been received at the first network node 12-1 in response to a HANDOVER REQUEST for a legacy reconfiguration (e.g., Handover), the first network node 12-1 initiates the SN release procedure (if the UE is operating in MR-DC). However, if the HANDOVER REQUEST ACKNOWLEDGE has been received in response to a HANDOVER REQUEST for a conditional reconfiguration (e.g., CHO), the first network node 12-1 refrains from initiating the SN release procedure (if the UE is operating in MR-DC).

In a case where the first network node 12-1 is operating as an S-MN in an MR-DC scenario and there are multiple target network nodes that are respective candidate for receiving the wireless device 14 in a CHO, the first network node 12-1 monitors for reception of a first message from one of the target candidates and, upon reception of that first message, initiates the SN release procedure if the UE is still operating in MR-DC at the time the message is received.

The first network node 12-1 may be an LTE eNodeB operating as MN configuring the UE with Conditional Reconfiguration, such as CHO. Here, the first network node 12-1 transmits to the UE an RRC Reconfiguration message containing a CHO configuration, e.g., the field conditionalReconfiguration of IE ConditionalReconfiguration to be defined in 3GPP TS 38.331.

Further example operations at a first network node 12-1 operating as a S-MN in a multi-connectivity scenario involving a second network node 12-2 operating as a S-SN for the multi-connectivity, include receiving from the second network node 12-2 an early data forwarding indication. For example, The early data forwarding indication corresponds to an EARLY FORWARDING TRANSFER received message over the Xn interface. The early data forwarding indication is received in response to the indication of early data forwarding transmitted from the first network node 12-1 to the second network node 12-2.

In an embodiment involving CHO in MR-DC operation, for the SN terminated bearers, the Early Forwarding Transfer procedure is used to transfer the COUNT of the first downlink SDU that the source S-NG-RAN node forwards in case of early data forwarding. Such a procedure may use the signaling shown in FIG. 5. Corresponding signaling is seen in FIG. 6, between the Source S-NG-RAN node (the S-SN) and the Source M-NG-RAN node (the S-MN).

The "DRBs Subject To Early Forwarding Transfer List" Information Element (IE) included in the EARLY FOR-WARDING TRANSFER message contains the DRB ID(s) corresponding to the DRB(s) subject to be simultaneously served by the source and the target NG-RAN nodes during DAPS Handover or the DRB(s) transferred during CHO.

For each DRB in the DRBs Subject To Early Forwarding Transfer List IE, the target NG-RAN node or the source M-NG-RAN node shall use the value of the DL COUNT Value IE as the COUNT of the first downlink SDU that the source NG-RAN node or the S-NG-RAN node forwards to the target NG-RAN node or the source M-NG-RAN node.

For each DRB in the DRBs Subject To Early Forwarding Transfer List IE for which the DISCARD DL COUNT Value IE is received in the EARLY FORWARDING TRANSFER message, the target NG-RAN node does not transmit for- warded downlink SDUs to the UE whose COUNT is less than the provided and discards them if transmission has not been attempted.

From the perspective of a second network node 12-2 operating as Source SN in a multi-connectivity scenario, example method steps or operations include receiving from a first network node 12-1 (which is a source node, e.g., a source gNodeB) information necessary for initiating early data forwarding (from Source SN to Source MN), transmit- ting to the first network node 12-1 an early data forwarding indication, and transmitting to the first network node 12-1 forwarded data. Data forwarded by the second network node 12-2 to the first network node 12-1 may then be forwarded by the first network node 12-1 towards a third network node 12-3 that is the CHO target.

Further operations at the second network node 12-2 are associated with handover success, or at least with signaling sent by the first network node 12-1 to the second network node 12-2, upon the first network node 12-1 receiving signaling indicating handover success—i.e., execution of the CHO by the wireless device 14 with respect to the targeted third network node 12-3. With the first network node 12-1 operating as a source NG-RAN node and the third network node 12-3 operating as the target NG-RAN node, FIG. 7 depicts example handover-success signaling. As an example, signaling may be defined in 3GPP TS 38.423.

More broadly, signaling from the third network node 12-3 to the first network node 12-1 upon successful execution of CHO of the wireless device 14 to the third network node 12-3 include messages such as a UE CONTEXT RELEASE message or a RETRIEVE UE CONTEXT REQUEST. Further, a message incoming to the first network node 12-1 that indicates that the CHO has been executed may come from the target node or from the UE, and it may be any message that indicates to the first network node 12-1 that the CHO has been executed.

As noted earlier, upon the first network node 12-1 deter- mining that the CHO handover has executed, it sends a release request message (SN RELEASE REQUEST) to the second network node 12-2, to terminate early data forward- ing at the second network node 12-2 and initiate release of the DRBs terminated at the second network node 12-2 for the multi-connectivity. In one embodiment, upon reception of the HANDOVER SUCCESS message, the first network node 12-1 initiates the release of resources at the second network node 12-2 by sending signaling to the second network node 12-2 that includes a Cause indicating MCG mobility. The second network node 12-2 acknowledges the release request. If (late) data forwarding is needed, the first network node 12-1 provides data forwarding addresses to the second network node 12-2. Reception of such messaging at the second network node 12-2 triggers the second network node 12-2 to stop providing user data to the wireless device 14 and, if applicable, to start the late data forwarding.

In one or more embodiments, therefore, the first network node 12-1 (e.g., S-MN) indicates to the second network node 12-2 (e.g., Source SN, S-SN) a cause value for the SN RELEASE REQUEST indicating that the release is trig- gered due to a CHO. The cause value may be at least one of the following:
  MN mobility;
    This may be used in case the S-SN does not need to perform any distinction between a CHO and a legacy HO as cause value, e.g., when transmitting the SN RELEASE REQUEST ACKNOWLEDGE.
  Conditional MN mobility;
    This may be used in case the S-SN needs to perform a distinction between a CHO and a legacy HO as cause value, e.g., when transmitting the SN RELEASE REQUEST ACKNOWLEDGE including specific information;
  MCG mobility;
    This may be used in case the S-SN does not need to perform any distinction between a CHO and a legacy HO as cause value, e.g., when transmitting the SN RELEASE REQUEST ACKNOWLEDGE.
  Conditional MCG mobility;
    This may be used in case the S-SN needs to perform a distinction between a CHO and a legacy HO as cause value, e.g., when transmitting the SN RELEASE REQUEST ACKNOWLEDGE including specific information;

In at least one embodiment, if the S-SN is forwarding data (e.g., for SN terminated bearers) to the MN, the SN Release Request Acknowledge message indicates that the S-SN froze PDCP and stopped sending DL data to the wireless device 14. A SN RELEASE REQUEST ACKNOWLEDGE mes- sage returned by the second network node 12-2 to the first network node 12-1 may confirm the resources have been released. FIG. 8 illustrates example signaling for release request and acknowledgment going between the first and second network nodes as M-NG-RAN and S-NG RAN nodes. In one or more embodiments, if the S-NG-RAN node provides data forwarding related information (which is received in the first network node, S-MN) in the S-NODE RELEASE REQUEST ACKNOWLEDGE message for QoS flows mapped to DRBs configured with an SN terminated bearer option in the PDU Sessions To Be Released List—SN terminated IE, the M-NG-RAN node may decide to provide data forwarding addresses to the S-NG-RAN node and trigger the Xn-U Address Indication procedure, as specified in TS 37.340 for CHO.

Further operations may include the first network node 12-1 operating as a Source MN receiving a SN Status Transfer from the second network node 12-2 operating as Source SN. The Source MN receives from the S-SN the uplink PDCP SN and HFN receiver status and the downlink PDCP SN and HFN transmitter status, for each respective DRB of the S-SN DRB configuration for which PDCP SN and HFN status preservation applies. The Source MN receives the SN STATUS TRANSFER message from the S-SN at the time point when it considers the transmitter/ receiver status to be frozen. In case of MR-DC, if the Source MN performs PDCP SN length change or RLC mode change for a DRB as specified in TS 37.340, it shall ignore the information received for that DRB in the message. The Source MN may receive in the SN STATUS TRANSFER message the missing and the received uplink SDUs in the Receive Status of UL PDCP SDUs IE, for each DRB for which the Source SN has accepted the request from the S-MN for uplink forwarding.

For each DRB in the DRBs Subject to Status Transfer List IE, the Source MN shall not deliver any uplink packet which has a PDCP-SN lower than the value contained within the UL Count Value IE. For each DRB in the DRBs Subject to Status Transfer List IE, the Source MN shall use the value of the PDCP SN contained within the DL COUNT Value IE for the first downlink packet for which there is no PDCP-SN yet assigned. If the Receive Status of UL PDCP SDUs IE is included for at least one DRB in the SN STATUS TRANS-FER message, the Source MN node may use it in a Status Report message sent to the wireless device 14 over the radio interface. If the SN STATUS TRANSFER message contains in the DRBs Subject To Status Transfer List IE the Old QoS Flow List—UL End Marker expected IE, the Source MN shall be prepared to receive the SDAP end marker for the QoS flow via the corresponding DRB, as specified in TS 38.300.

Note that early data forwarded from the second network node 12-2 to the first network node 12-1 may include DL data not acknowledged by the wireless device 14. More generally, the data subject to early forwarding from the second network node 12-2 to the first network node 12-1 for further forwarding towards a third network node 12-3 targeted by a CHO, may be DL data the second network node 12-2 will still be receiving from the UPF or UL data that it may still be receiving from the UE 14.

The second network node 12-2 may be notified that CHO is being configured at the involved wireless device 14. For example, the second network node 12-2 receives a message from the first network node 12-1 (e.g., SN REQUEST RELEASE message) with an indication that this is being triggered because the wireless device 14 has been configured with CHO. In that case, upon reception, the Source SN does not release the SN resources, but it gets prepared for such release (e.g., upon later reception of another SN REQUEST RELEASE message) and transmits to the first network node 12-1 an SN REQUEST RELEASE ACKNOWLEDGE.

The procedures supporting early forwarding from secondary network nodes 12 in multi-connectivity scenarios, via the master network node 12, may require changes in the 3GPP TS 38.423 specifications, such as in the Handover Success procedure.

For example, for CHO in MR-DC operation, for the SN terminated bearers, the Early Forwarding Transfer procedure is used to transfer the COUNT of the first downlink SDU that the source S-NG-RAN node forwards in case of early data forwarding.

Further, the DRBs Subject To Early Forwarding Transfer List IE included in the EARLY FORWARDING TRANS-FER message contains the DRB ID(s) corresponding to the DRB(s) subject to be simultaneously served by the source and the target NG-RAN nodes during DAPS Handover or the DRB(s) transferred during CHO.

Still further, for each DRB in the DRBs Subject To Early Forwarding Transfer List IE, the target NG-RAN node or the source M-NG-RAN node shall use the value of the DL COUNT Value IE as the COUNT of the first downlink SDU that the source NG-RAN node or the S-NG-RAN node forwards to the target NG-RAN node or the source M-NG-RAN node. For each DRB in the DRBs Subject To Early Forwarding Transfer List IE for which the DISCARD DL COUNT Value IE is received in the EARLY FORWARD-ING TRANSFER message, the target NG-RAN node does not transmit forwarded downlink SDUs to the UE whose COUNT is less than the provided and discards them if transmission has not been attempted.

The disclosed early data forwarding in multi-connectivity may also require changes in the 3GGP TS 37.340. In particular, in the existing defined signal flow for the MN to ng-eNB/gNB Change procedure, resource release at the S-SN is deferred until the S-MN has received an indication of successful execution of CHO. The S-MN may use the XN-U Address Indication to indicate to the S-SN that early data forwarding is to be used—i.e., applied by the S-SN to SN-terminated bearers for the involved UE. In that context, the S-SN sends an EARLY FORWARDING TRANSFER message to the S-MN.

Among other things, one or more of the embodiments disclosed herein address the case of a UE operating in MR-DC and a source node that wants to configure conditional handover (also called conditional reconfiguration) wants to perform early data forwarding i.e., data forwarding starts before the CHO execution, for the UE in MR-DC operation. The example method(s) comprises different actions between the network nodes to enable early data forwarding in that mobility scenario.

The example method(s) enable a source MN to perform early data forwarding for a UE operating in MR-DC, for a UE to be configured with Conditional Reconfiguration (e.g., Conditional Handover—CHO. In other words, a Source MN would be able to request CHO for target candidates, and initiate early data forwarding from Source SN to source MN, for SN terminated bearers, enabling a target candidate to receive early data for a possibly incoming UE having SN terminated bearers.

FIG. 9 illustrates a network node 12-X, such as a radio network node, configured for operation in a wireless communication network 10. The "–X" suffixing indicates that the network node 12-X may be configured as source master node in a multi-connectivity scenario—e.g., the "first" network node 12-1 described in any of the foregoing embodiments—or as a source secondary node in a multi-connectivity scenario—e.g., as the "second" network node 12-2 described in any of the foregoing embodiments.

Thus, with reference to FIG. 9, an example first network node 12-1 is configured for operation in a wireless communication network 10 and comprises first communication interface circuitry 20-1 configured for communicatively coupling the first network node 12-1 to one or more other network nodes 12. Further, the first network node 12-1 comprises second communication interface circuitry 20-2 configured for communicatively coupling the first network node 12-1 to a wireless device 14. The second communication interface circuitry 20-2 includes or is associated with one or more transmit/receive antennas 24.

Still further, the first network node 12-1 comprises processing circuitry 26-1 that is operatively associated with the first and second communication interface circuitry 20-1, 20-2, and may include or be associated with storage 28-1, which comprises one or more types of computer-readable media.

The processing circuitry 26-1 is configured to transmit a handover request to a third network node 12-3, the handover request including an indication of conditional handover of the wireless device 14 to the third network node 12-3. In this context, the first network node 12-1 and a second network node 12-2 are in multi-connectivity with the wireless device 14. Further, the processing circuitry 26-1 is configured to receive a handover request acknowledgment from the third network node 12-3 and transmit a message to the second network node 12-2, for initiation of early data forwarding from the second network node 12-2 to the first network node 12-1 of data associated with the wireless device 14. Additionally, the processing circuitry 26-1 is configured to transmit configuration information for the conditional handover to the wireless device 14.

As explained, in one or more embodiments, with respect to the multi-connectivity, the first network node 12-1 operates as a Source Master Node (S-MN) with respect to the wireless device 14 and the second network node 12-2 operates as a Source Secondary Node (S-SN).

The early data forwarding may apply with respect to one or more Data Radio Bearers (DRBs) that are used in the multi-connectivity and terminated at the second network node 12-2, and the message transmitted to the second network node 12-2 comprises, for example, forwarding addresses associated with the data forwarding. In one or more embodiments, the message is an Xn-U address indication message.

Further, in at least one embodiment, the processing circuitry 26-1 is configured to transmit early-forwarded data to the third network node 12-3. The early-forwarded data includes first data associated with DRBs of the multi-connectivity that are terminated at the first network node 12-1 and second data associated with the DRBs of the multi-connectivity that are terminated at the second network node 12-2. The second data is received at the first network node 12-1 via early forwarding by the second network node 12-2 to the first network node 12-1.

Further, in one or more embodiments, the processing circuitry 26-1 is configured to receive from the third network node 12-3 an indication of handover success for the wireless device 14, and, in response, transmit a release request to the second network node 12-2, requesting release of DRBs of the multi-connectivity that are terminated at the second network node 12-2.

In the same embodiment or in yet another embodiment, the processing circuitry 26-1 is configured to receive an early forwarding transfer message from the second network node 12-2, in response to the message sent by the first network node 12-1 to initiate the early data forwarding. The early forwarding transfer message indicates DRBs at the second network node 12-2 that are subject to early data forwarding by the second network node 12-2 to the first network node 12-1.

In one or more embodiments, the multi-connectivity with the wireless device 14 is MR-DC supported by the first network node 12-1 and the second network node 12-2. To support such multi-connectivity, the wireless device 14 comprises, in an example embodiment, circuitry such as shown in FIG. 10. Particularly, the example wireless device 14 comprises communication circuitry 30 and one or more associated transmit/receive antennas 32, along with processing circuitry 34 and associated storage 36, which comprise one or more types of computer-readable media.

Referring back to FIG. 9 but with respect to an example second network node 12-2, the example network node 12-2 is configured for operation in a wireless communication network 10. In particular, the second network node 12-2 comprises first communication interface circuitry 20-1 configured for communicatively coupling the second network node 12-2 to one or more other network nodes 12, and second communication interface circuitry 20-2 configured for communicatively coupling the second network node 12-2 to wireless devices 14.

Further, the second network node 12-2 comprises processing circuitry 26-2 operatively associated with the first and second communication interface circuitry 20-1, 20-2. The processing circuitry 26-2 is configured to receive a message from a first network node 12-1, for initiation of early data forwarding from the second network node 12-2 to the first network node 12-1, for data associated with a wireless device 14 that is in multi-connectivity with the first and second network nodes 12-1, 12-2. The processing circuitry 26-2 is configured to initiate the early data forwarding to the first network node 12-1, in response to the message.

In one or more example embodiments, with respect to the multi-connectivity, the second network node 12-2 operates as a S-SN and the first network node 12-1 operates as a S-MN. The early data forwarding applies with respect to one or more DRBs that are used in the multi-connectivity and terminated at the second network node 12-2. The message received from the first network node 12-1 for initiation of the early data forwarding, for example, is an Xn-U address indication message. In one or more embodiments, as part of initiating the early data forwarding, the processing circuitry 26-2 is configured to transmit an early forwarding transfer message to the first network node 12-1, the early forwarding transfer message indicating DRBs at the second network node 12-2 that are subject to the early data forwarding.

Further, in one or more embodiments, the processing circuitry 26-2 is configured to receive a release request from the first network node 12-1 subsequent to the initiation of the early data forwarding and, in response, terminate the early data forwarding and initiate a release of DRBs terminated at the second network node 12-2 for the multi-connectivity.

In at least one embodiment, the message received at the second network node 12-2 for initiation of early data forwarding by the second network node 12-2 includes an indication of CHO of the wireless device 14. Here, the processing circuitry 26-2 is configured to initiate the early data forwarding in response to the indication of CHO.

FIG. 11 illustrates an example method 1100 performed by a first network node 12-1 of a wireless communication network 10. The method 1100 comprises:

transmitting (Block 1102) a handover request to a third network node 12-3, the handover request including an indication of CHO of a wireless device 14 to the third network node 12-3, wherein the first network node 12-1 and a second network node 12-2 are in multi-connectivity with the wireless device 14;

receiving (Block 1104) a handover request acknowledgment from the third network node (12-3);

transmitting (Block 1106) a message to the second network node 12-2, for initiation of early data forwarding from the second network node 12-2 to the first network node 12-1 of data associated with the wireless device 14; and transmitting (Block 1108) configuration information for the CHO to the wireless device 14.

With respect to the multi-connectivity, the first network node 12-1 may operates as a S-MN and the second network node 12-2 may operate as a S-SN. The early data forwarding applies with respect to one or more DRBs that are terminated at the second network node 12-2 and used for the multi-connectivity. The message transmitted to the second network node 12-2 comprises, in one or more embodiments, forwarding addresses associated with the early data forwarding. As a particular example, the message is an Xn-U address indication message.

The method 1100 in at least one embodiment further comprises the first network node 12-1 transmitting early-forwarded data to the third network node 12-3, the early-forwarded data including first data associated with DRBs of the multi-connectivity that are terminated at the first network node 12-1 and second data associated with the DRBs of the multi-connectivity that are terminated at the second network node 12-2, the second data being received at the first network node 12-2 via the early forwarding by the second network node 12-2 to the first network node 12-1.

Further, in at least one embodiment, the method 1100 includes, in response to the first network node 12-1 receiving an indication of handover success for the wireless device 14 from the third network node 12-3, the first radio network node 12-1 transmitting a release request to the second network node 12-2, requesting release of DRBs of the multi-connectivity that are terminated at the second network node 12-2.

In one or more embodiments, the method 1100 further comprises the first network node 12-1 receiving an early forwarding transfer message from the second network node 12-2, in response to the message sent by the first network node 12-1 to initiate the early data forwarding. The early forwarding transfer message indicates DRBs at the second network node 12-2 that are subject to the early data forwarding.

FIG. 12 illustrates another embodiment comprising a method 1200 performed by a first network node 12-1, acting as a S-MN in a multi-connectivity arrangement that includes a second network node 12-2 acting as a S-SN in the multi-connectivity arrangement, and where a third network node 12-3 is a target for CHO of the wireless device 14 being served via the multi-connectivity.

The method 1200 includes the first network node 12-1 determining (Block 1202) to configure a wireless device 14 with a conditional reconfiguration, e.g., a CHO configuration, and transmitting (Block 1204) a handover request to the third network node 12-3, with the request indicating a CHO. The first network node 12-1 receives (Block 1206) a handover acknowledgment from the third network node 12-3 and, correspondingly, transmits (Block 1208) to the second network node 12-2 information enabling the second network node 12-2 to initiate early data forwarding. The information transmitted, for example, is a message comprising forwarding addresses associated with the early data forwarding. In a particular example, the message is an Xn-U address indication message that includes an indication indicating the CHO and/or the need for early forwarding.

FIG. 13 illustrates another embodiment comprising a method 1300 performed by a second network node 12-2 of a wireless communication network 10. The method 1300 comprises: receiving (Block 1302) a message from a first network node 12-1, for initiation of early data forwarding from the second network node 12-2 to the first network node 12-1, for data associated with a wireless device 14 in multi-connectivity with the first and second network nodes 12-1, 12-2. In response to the message, the second network node 12-2 initiates (Block 1304) the early data forwarding to the first network node 12-1. The message includes an indication of CHO, for example, such that the initiation of the early data forwarding by the second network node 12-2 is responsive to the indication of conditional handover.

In at least one embodiment, with respect to the multi-connectivity, the second network node 12-2 operates as a S-SN and the first network node 12-1 operates as a S-MN. The early data forwarding applies with respect to one or more DRBs that are used in the multi-connectivity and terminated at the second network node 12-2. The multi-connectivity is, for example, MR-DC supported by the first network node 12-1 and the second network node 12-2.

Initiating (Block 1304) the early data forwarding comprises, for example, transmitting an early forwarding transfer message to the first network node 12-1. The early forwarding transfer message indicates DRBs at the second network node 12-2 that are subject to the early data forwarding.

The method 1300 may also include the second network node 12-2 receiving a release request from the first network node 12-1 subsequent to the initiation of the early data forwarding. In response to the release request, the second network node 12-2 terminates the early data forwarding and initiates a release of DRBs terminated at the second network node 12-2 for the multi-connectivity.

FIG. 14 illustrates another embodiment comprising a method 1400 performed by a second network node 12-2, acting as a S-SN in a multi-connectivity arrangement that includes a first network node 12-1 acting as a S-MN in the multi-connectivity arrangement, and where a third network node 12-3 is a target for CHO of the wireless device 14 being served via the multi-connectivity.

The method 1400 includes the second network node 12-2 receiving (Block 1402), from the first network node 12-1, information for initiating early data forwarding from the second network node 12-2 to the first network node 12-1. Here, the early data forwarding refers to data associated with one or more bearers terminated at the second network node 12-2 for the multi-connectivity, and the data may include DL data and/or UL data associated with the wireless device 14 being served via the multi-connectivity. In at least one example, the data is DL data that is pending for the wireless device 14 or has not been acknowledged by the wireless device 14.

The method 1400 further includes the second network node 12-2 transmitting (Block 1404) to the first network node 12-1 an early data forwarding indication. The transmission may include details, such as the bearer(s) involved in the early data forwarding, etc. The method 1400 continues with the second network node 12-2 transmitting (Block 1406) early data to the first network node 12-1. Such transmission may be an ongoing or continuing operation, at least until further signaling from the first network node 12-1 indicates a termination of the early data forwarding.

In a broad view of the techniques disclosed herein, it will be appreciated that some embodiments are directed to methods of operation and other embodiments include corresponding apparatuses. Embodiments herein for instance include a wireless device (a UE) configured to perform any of the steps of any of the embodiments described above for the wireless device 14.

Embodiments also include a wireless device comprising processing circuitry and power supply circuitry. The processing circuitry is configured to perform any of the steps of any of the embodiments described above for the wireless device 14. The power supply circuitry is configured to supply power to the wireless device.

Embodiments further include a wireless device comprising processing circuitry. The processing circuitry is configured to perform any of the steps of any of the embodiments described above for the wireless device 14. In some embodiments, the wireless device further comprises communication circuitry.

Embodiments further include a wireless device comprising processing circuitry and memory. The memory contains instructions executable by the processing circuitry whereby the wireless device is configured to perform any of the steps of any of the embodiments described above for the wireless device 14.

Embodiments moreover include a user equipment (UE). The UE comprises an antenna configured to send and receive wireless signals. The UE also comprises radio front-end circuitry connected to the antenna and to processing circuitry and configured to condition signals communicated between the antenna and the processing circuitry. The processing circuitry is configured to perform any of the steps of any of the embodiments described above for the wireless device 14. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include one or more network nodes configured to perform any of the method embodiments described above for the respective network nodes 12-1, 12-2, or 12-3. In one or more corresponding apparatus embodiments, the network node(s) are radio network nodes, such as gNBs in a radio access network based on 5G NR specifications, or ng-eNBs configured for communicative coupling to a Fifth Generation Core (5GC) network.

Embodiments also include a network node comprising processing circuitry and power supply circuitry. The processing circuitry is configured to perform any of the steps of any of the embodiments described above for the network node 12-1, 12-2, or 12-3. The power supply circuitry is configured to supply power to the radio network node.

Embodiments further include a network node comprising processing circuitry. The processing circuitry is configured to perform any of the steps of any of the embodiments described above for the network node 12-1, 12-2, or 12-3. In some embodiments, the network node further comprises communication circuitry, such as communication circuitry for exchanging message or other signaling with other network nodes of the same or different types and/or communication circuitry to provide an air interface comprising DL signal transmission and UL signal reception, for providing communication services to respective wireless devices 14. In at least one embodiment, the network nodes 12-1 and 12-2 support multi-connectivity, such as MR-DC, wherein a wireless device 14 is served by two or more connections provided by the network nodes 12 participating in the multi-connectivity.

Embodiments further include a network node comprising processing circuitry and memory. The memory contains instructions executable by the processing circuitry whereby the network node is configured to perform any of the steps of any of the embodiments described above for any of the network node(s) 12.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 15:
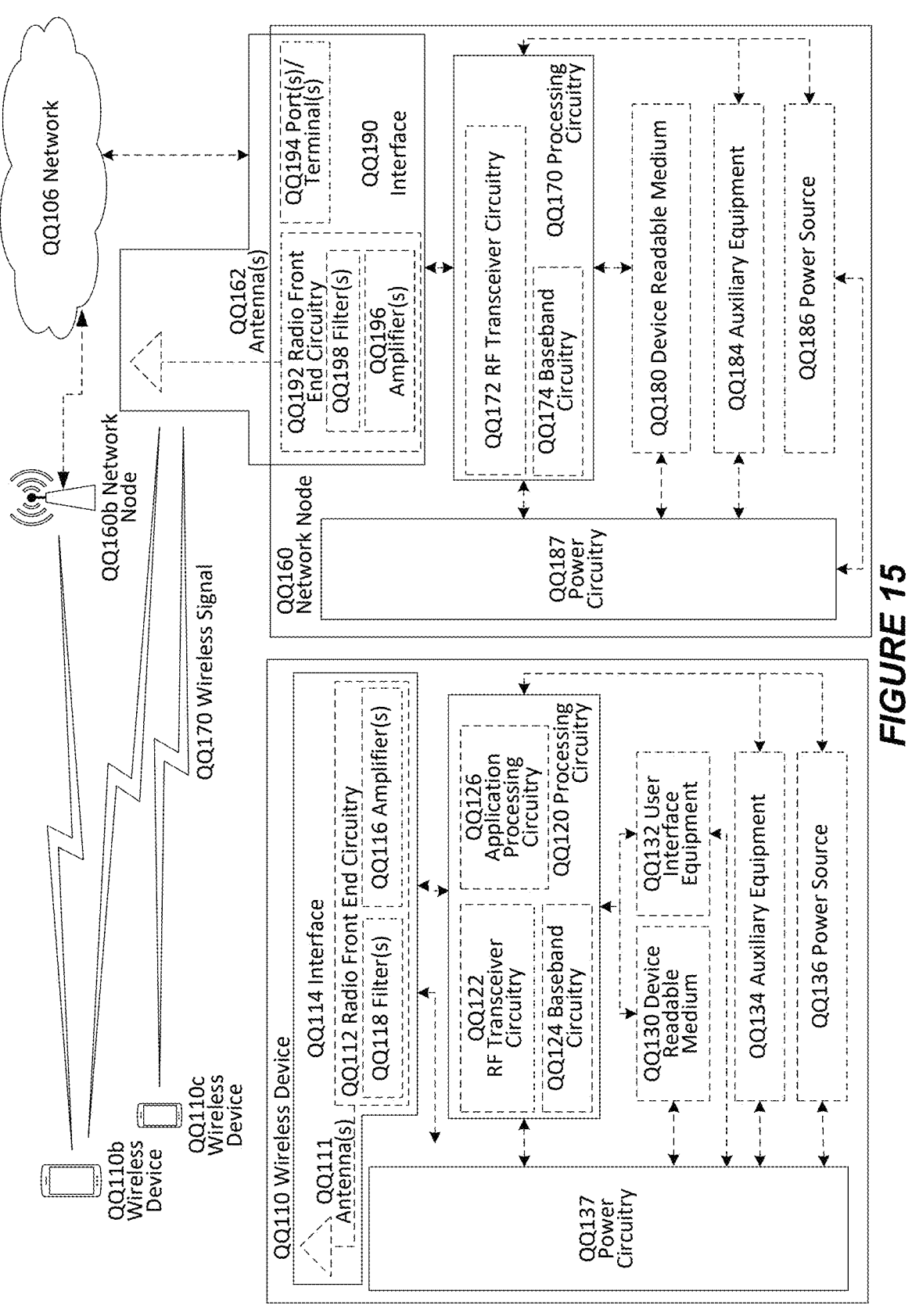
FIG. 15 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMAX), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, "network node" refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay.

A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

FIG. 15 may be understood as a more detailed example of the wireless communications network 10 shown in FIG. 1, according to a particular embodiment. As such, the wireless device QQ110 may be a particular embodiment of the wireless device 14 described earlier herein, and the network node QQ160 may be a particular embodiment of any one of the network nodes 12-1, 12-2, or 12-3 described earlier herein.

In FIG. 15, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, Wi-Fi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160 but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190.

In some embodiments, processing circuitry QQ170 and device readable medium QQ180 may be considered to be integrated.

Interface QQ190 is used in the wired or wireless communication of signaling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 15 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, Wi-Fi, WiMAX, NB-IoT, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120 and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110 and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management cir-cuitry. Power circuitry QQ137 may additionally or alterna-tively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modifi-cation to the power from power source QQ136 to make the power suitable for the respective components of WD QQ110 to which power is supplied.

Figure 16:
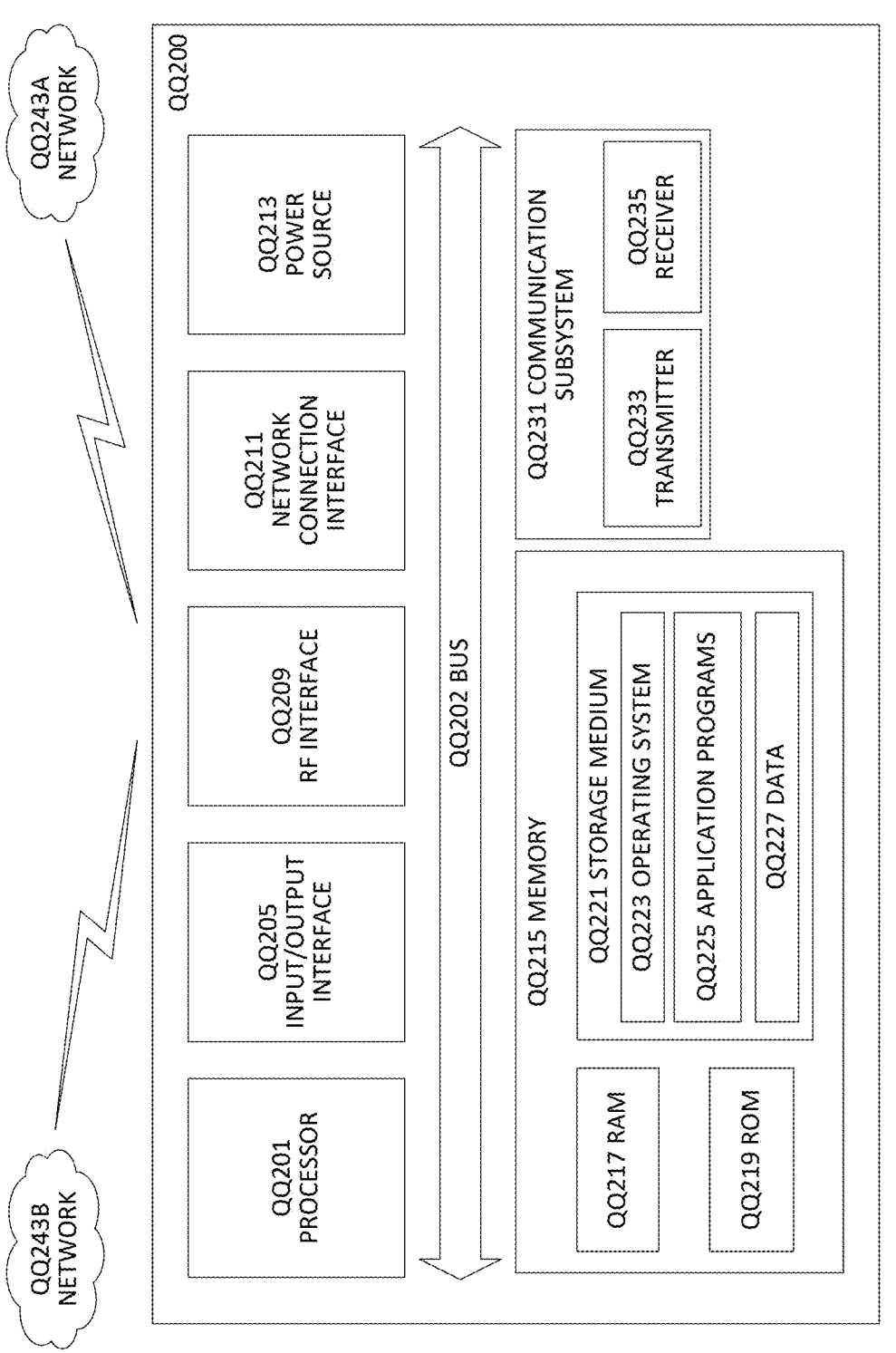
FIG. 16 is a block diagram of a user equipment according to some embodiments.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 16, is one example of a WD configured for commu-nication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 16, or only a subset of the components. The level of integration between the compo-nents may vary from one UE to another UE. Further, certain UEs may contain multiple instances of a component, such as multiple processors, memories, transceivers, transmitters, receivers, etc.

In FIG. 16, processing circuitry QQ201 may be config-ured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface QQ209 may be configured to provide a communication interface to RF components such as a transmitter, a receiver, and an antenna. Network con-nection interface QQ211 may be configured to provide a communication interface to network QQ243a. Network QQ243a may encompass wired and/or wireless networks such as a local-area network (LAN), a wide-area network (WAN), a computer network, a wireless network, a telecom-munications network, another like network or any combi-nation thereof. For example, network QQ243a may com-prise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functional-ity appropriate to the communication network links (e.g., optical, electrical, and the like). The transmitter and receiver functions may share circuit components, software or firm-ware, or alternatively may be implemented separately.

RAM QQ217 may be configured to interface via bus QQ202 to processing circuitry QQ201 to provide storage or caching of data or computer instructions during the execu-tion of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 16, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMAX, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 17:
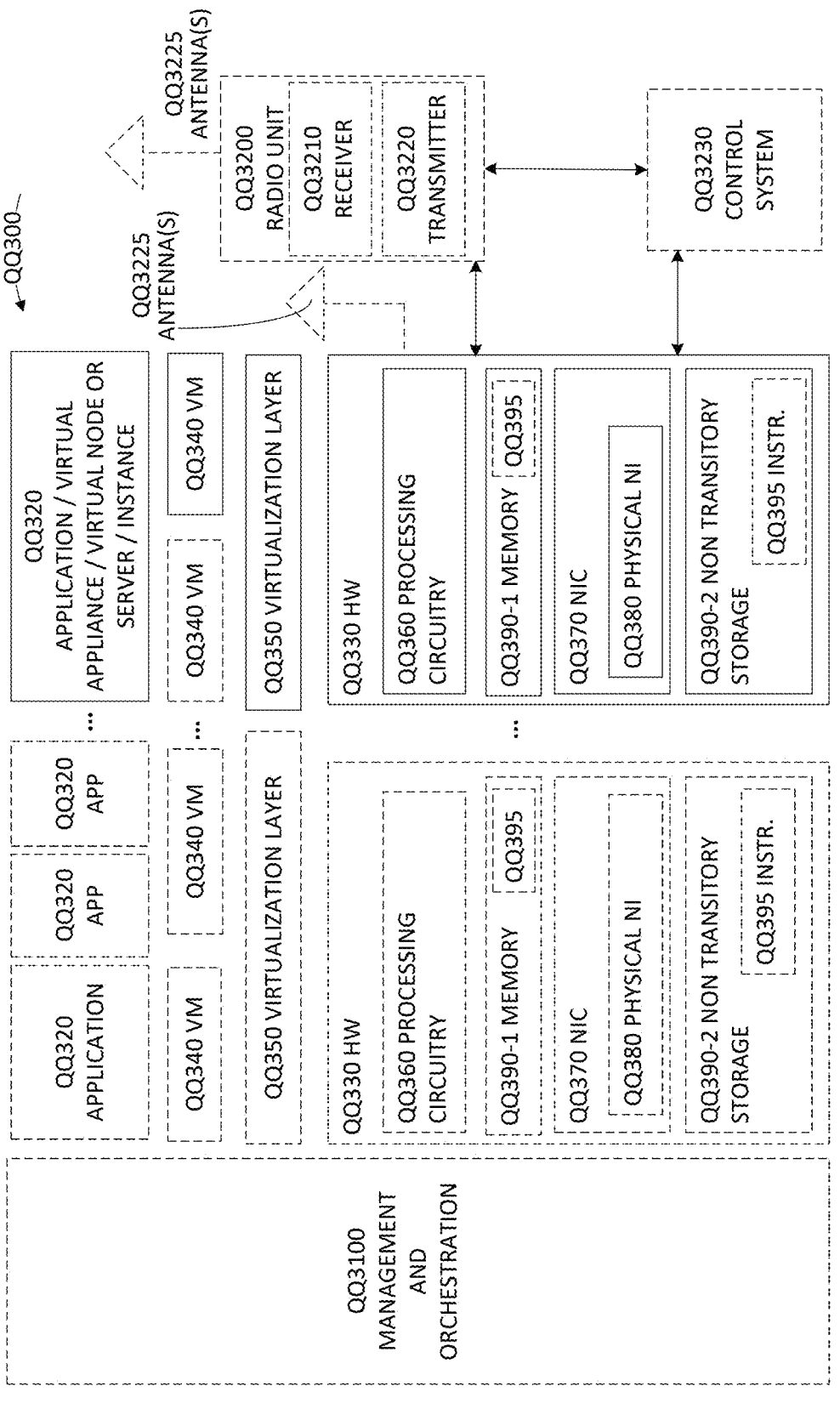
FIG. 17 is a block diagram of a virtualization environment according to some embodiments.

FIG. 17 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 17, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g., such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 17.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signaling can be effected with the use of control system QQ3230 which may alternatively be used for communication between the hardware nodes QQ330 and radio units QQ3200.

Figure 18:
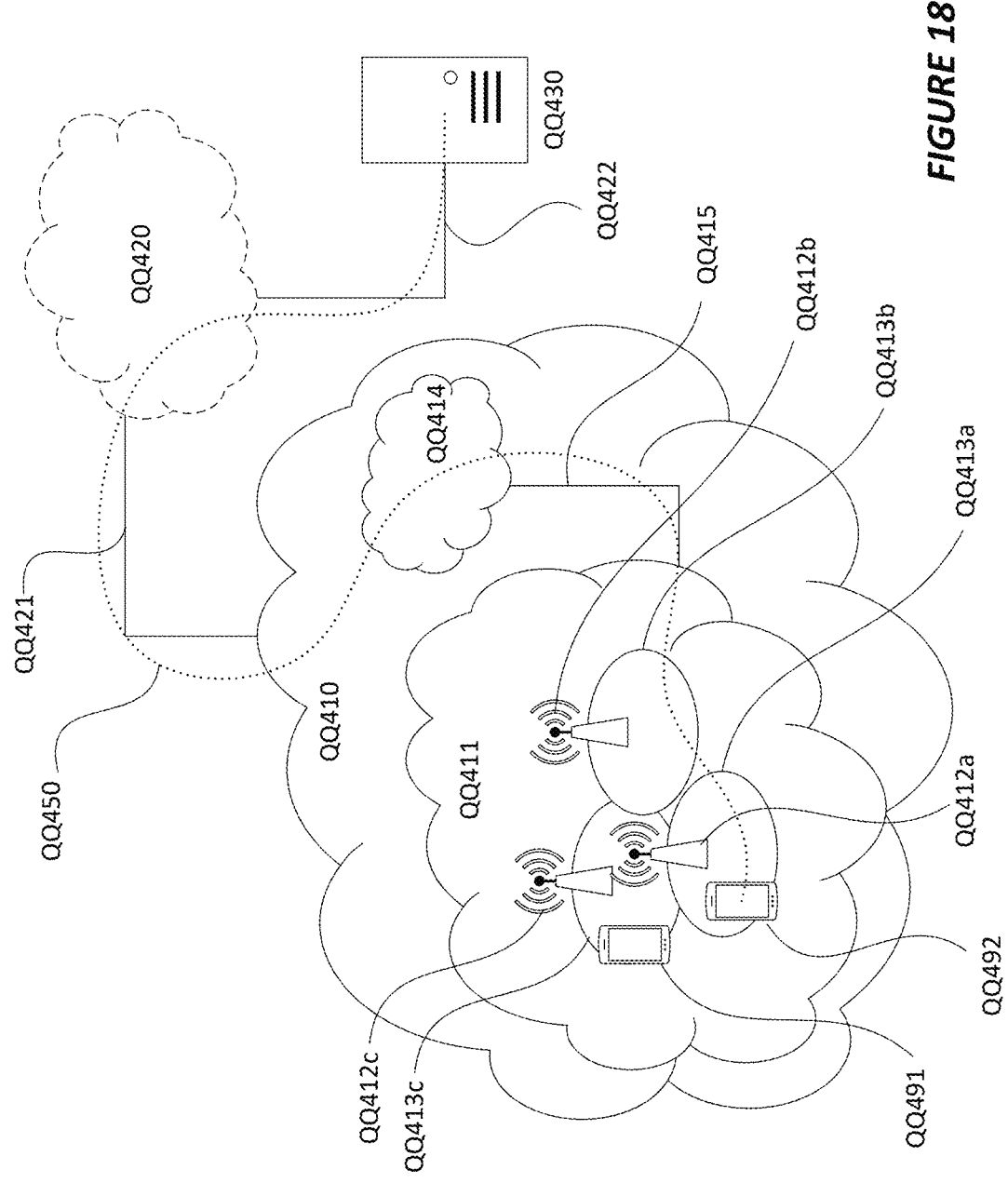
FIG. 18 is a block diagram of a communication network with a host computer according to some embodiments.

FIG. 18 illustrates a telecommunication network connected via an intermediate network to a host computer in accordance with some embodiments. In particular, with reference to FIG. 18, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 18 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 19:
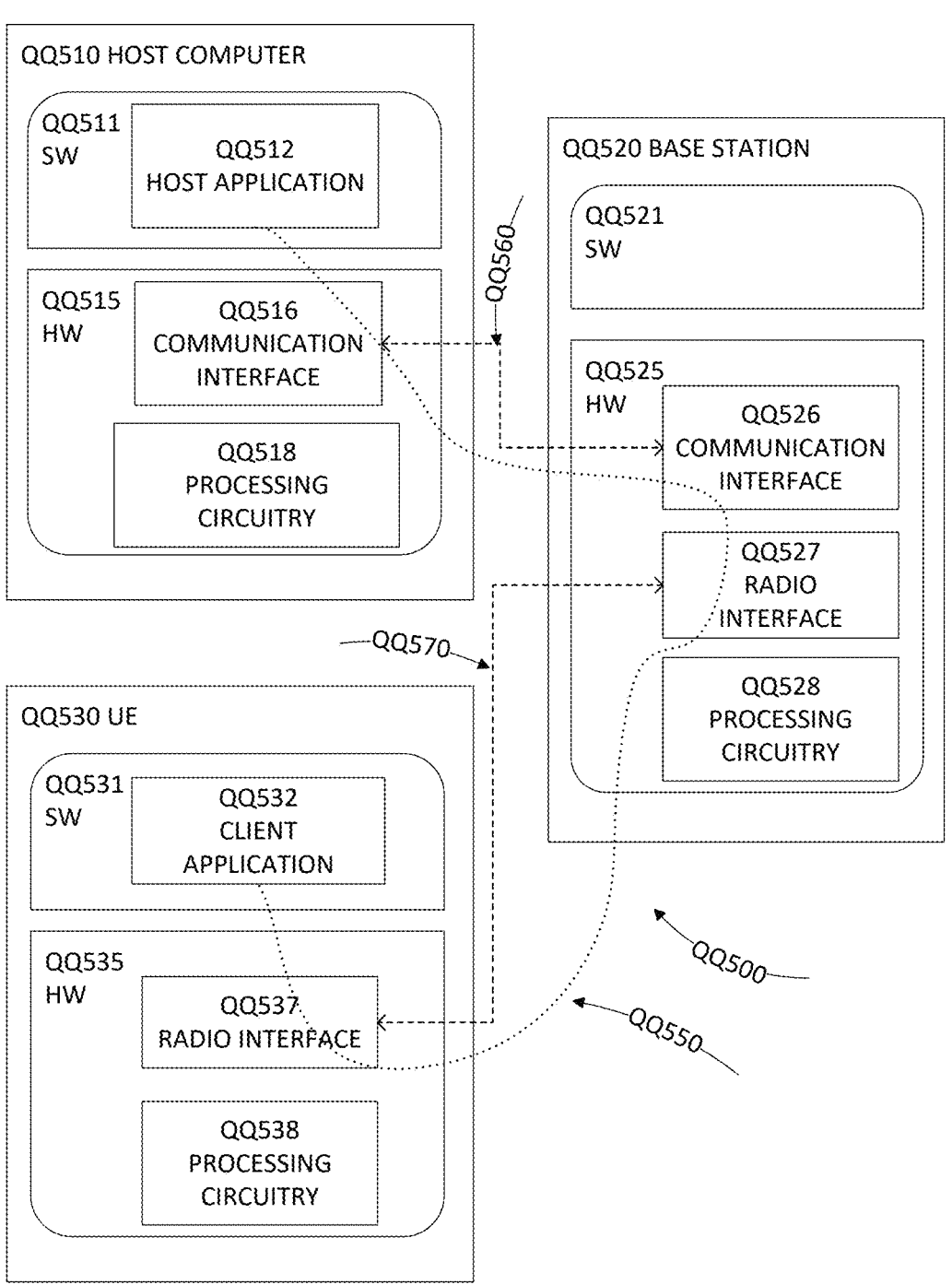
FIG. 19 is a block diagram of a host computer according to some embodiments.

Example implementations, in accordance with an embodiment, of the UE, base station and host computer discussed in the preceding paragraphs will now be described with reference to FIG. 19. FIG. 19 illustrates host computer communicating via a base station with a user equipment over a partially wireless connection in accordance with some embodiments In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 19) served by base station QQ520. Communication interface QQ526 may be configured to facilitate connection QQ560 to host computer QQ510. Connection QQ560 may be direct, or it may pass through a core network (not shown in FIG. 19) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 19 may be similar or identical to host computer QQ430, one of base stations QQ412a, QQ412b, QQ412c and one of UEs QQ491, QQ492 of FIG. 18, respectively. This is to say, the inner workings of these entities may be as shown in FIG. 19 and independently, the surrounding network topology may be that of FIG. 18.

In FIG. 19, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 20:
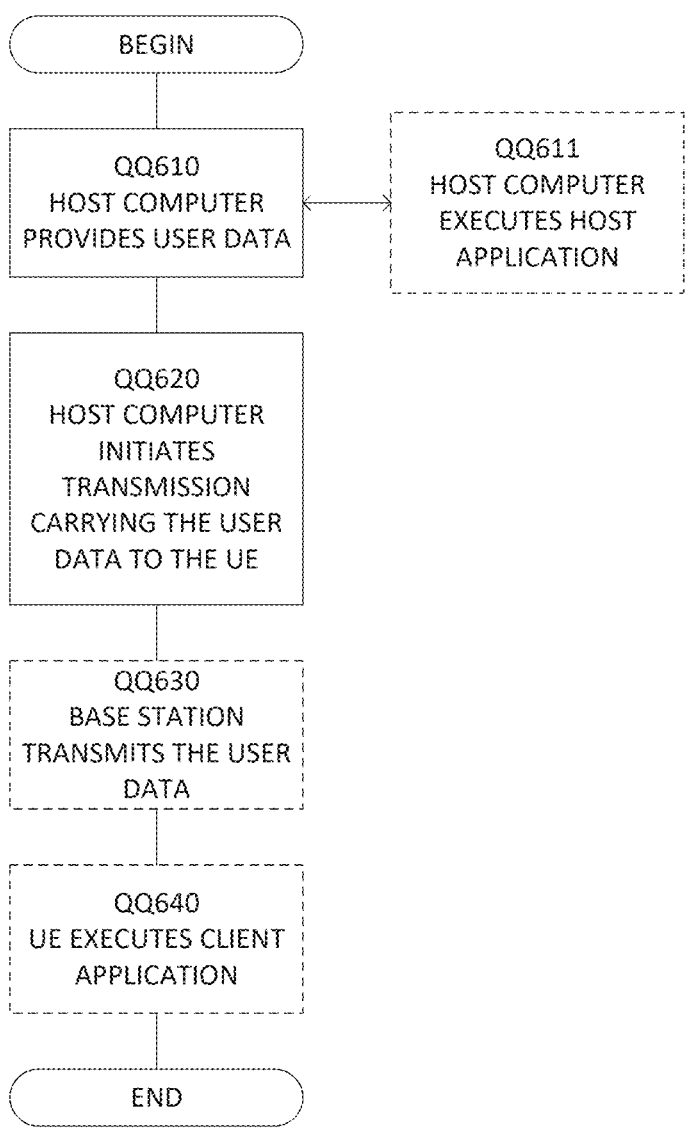
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step QQ610, the host computer provides user data. In sub-step QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 21:
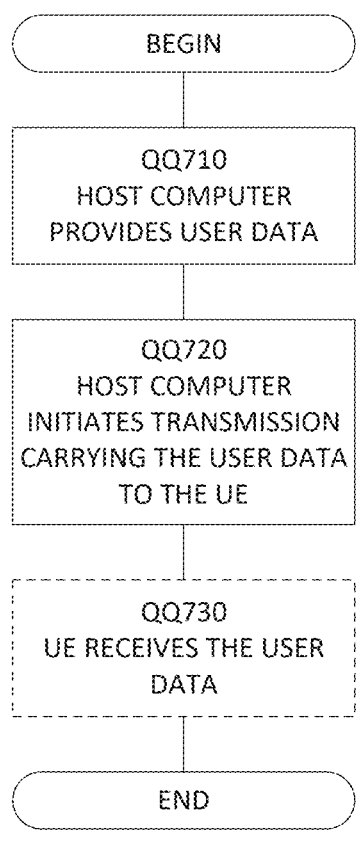
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step QQ710 of the method, the host computer provides user data. In an optional sub-step (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 22:
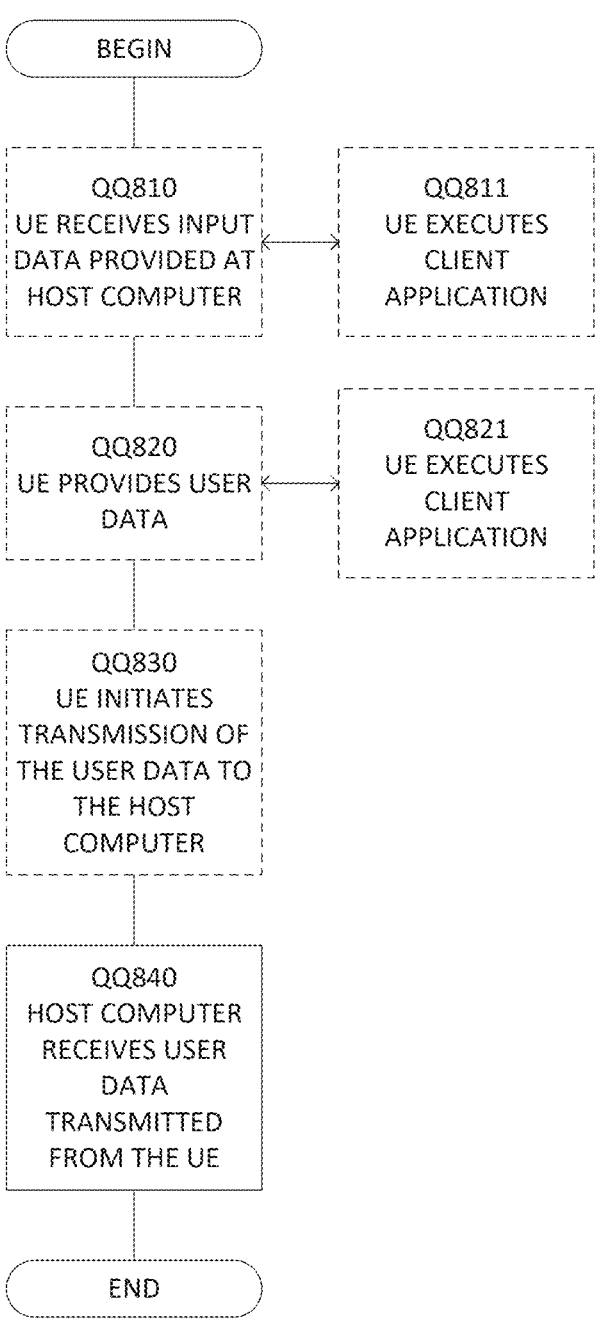
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step QQ810 (which may be optional), the UE receives input data provided by the host computer. Additionally or alternatively, in step QQ820, the UE provides user data. In sub-step QQ821 (which may be optional) of step QQ820, the UE provides the user data by executing a client application. In sub-step QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in sub-step QQ830 (which may be optional), transmission of the user data to the host computer. In step QQ840 of the method, the host computer receives the user data transmitted from the UE, in accordance with the teachings of the embodiments described throughout this disclosure.

Figure 23:
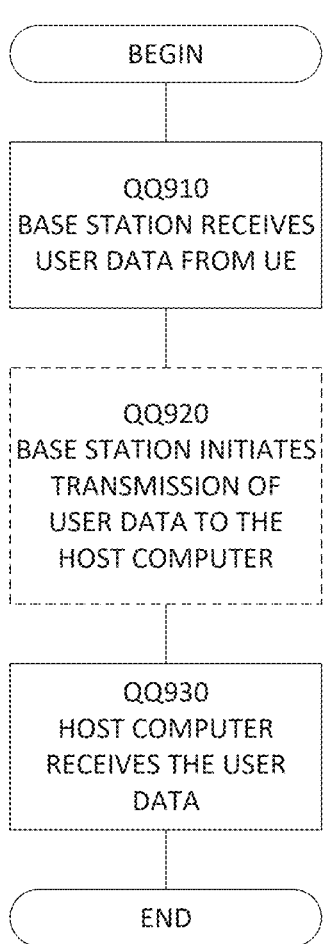
FIG. 23 is a flowchart illustrating a method implemented in a communication system, in accordance with one embodiment.

FIG. 23 is a flowchart illustrating a method implemented in a communication system, in accordance with one embodiment. The communication system includes a host computer, a base station and a UE which may be those described with reference to FIG. 18 and 19. For simplicity of the present disclosure, only drawing references to Figure QQ9 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a first network node of a wireless communication network, the method comprising:
transmitting a handover request to a third network node, the handover request including an indication of conditional handover of a wireless device to the third network node, wherein the first network node and a second network node are in multi-connectivity with the wireless device;
receiving a handover request acknowledgment from the third network node;
transmitting an Xn-U address indication message containing a conditional handover (CHO) indicator to the second network node, for initiation of early data forwarding from the second network node to the first network node of data associated with the wireless device, the CHO indicator indicating which data radio bearers (DRBs) at the second network node are subject to the early data forwarding;
receiving an early data forwarding indication from the second network node in response to transmitting the Xn-U address indication message;
transmitting configuration information for the CHO to the wireless device;
before receiving an indication of handover success for the wireless device from the third network node, performing early data forwarding for the wireless device by transmitting early-forwarded data to the third network node, the early-forwarded data including first data associated with data radio bearers (DRBs) of the multi-connectivity that are terminated at the first network node and second data associated with the subject DRBs at the second network node, the second data being received at the first network node via early forwarding by the second network node to the first network node;
receiving the indication of handover success for the wireless device from the third network node, wherein the indication of handover success is an indication of the execution of the CHO by the wireless device to the third network node; and
in response to receiving the indication of handover success for the wireless device from the third network node, transmitting a release request to the second network node, requesting release of the subject DRBs at the second network node.

2. The method of claim 1, wherein, with respect to the multi-connectivity, the first network node operates as a Source Master Node (S-MN) and the second network node operates as a Source Secondary Node (S-SN).

3. The method of claim 1, wherein the Xn-U address indication message transmitted to the second network node comprises forwarding addresses associated with the early data forwarding.

4. The method of claim 1, wherein the multi-connectivity is Multi-Radio Dual Connectivity (MR-DC) supported by the first network node and the second network node.

5. A first network node configured for operation in a wireless communication network, the first network node comprising:
first communication interface circuitry configured for communicatively coupling the first network node to one or more other network nodes;
second communication interface circuitry configured for communicatively coupling the first network node to a wireless device; and
processing circuitry operatively associated with the first and second communication interface circuitry and configured to:
transmit a handover request to a third network node, the handover request including an indication of conditional handover (CHO) of the wireless device to the third network node, wherein the first network node and a second network node are in multi-connectivity with the wireless device;
receive a handover request acknowledgment from the third network node;
transmit an Xn-U address indication message containing a CHO indicator to the second network node, for initiation of early data forwarding from the second network node to the first network node of data associated with the wireless device, the CHO indicator indicating which data radio bearers (DRBs) at the second network node are subject to the early data forwarding;
receive an early data forwarding indication from the second network node in response to transmitting the Xn-U address indication message;
transmit configuration information for the CHO to the wireless device;
before receiving an indication of handover success for the wireless device from the third network node, perform early data forwarding for the wireless device by transmitting early-forwarded data to the third network node, the early-forwarded data including first data associated with data radio bearers (DRBs) of the multi-connectivity that are terminated at the first network node and second data associated with the subject DRBs at the second network node, the second data being received at the first network node via early forwarding by the second network node to the first network node;
receive the indication of handover success for the wireless device from the third network node, wherein the indication of handover success is an indication of the execution of the CHO by the wireless device to the third network node; and in response to receiving the indication of handover success for the wireless device from the third network node, transmit a release request to the second network node, requesting release of the subject DRBs at the second network node.

6. The first network node of claim 5, wherein, with respect to the multi-connectivity, the first network node operates as a Source Master Node (S-MN) with respect to the wireless device and the second network node operates as a Source Secondary Node (S-SN).

7. The first network node of claim 5, wherein the Xn-U address indication message transmitted to the second network node comprises forwarding addresses associated with the data forwarding.

8. The first network node of claim 5, wherein the multi-connectivity is Multi-Radio Dual Connectivity (MR-DC) supported by the first network node and the second network node.

9. A method performed by a second network node of a wireless communication network, the method comprising:

receiving an Xn-U address indication message containing a conditional handover (CHO) indicator from a first network node, for initiation of early data forwarding from the second network node to the first network node, for data associated with a wireless device in multi-connectivity with the first and second network nodes;

responsive to the Xn-U address indication message containing the CHO indicator, initiating the early data forwarding to the first network node by transmitting an early data forwarding indication and early forwarding data to the first network node, the early forwarding data associated with Data Radio Bearers (DRBs) indicated in the CHO indicator as being subject to the early data forwarding; and receiving a release request from the first network node subsequent to the initiation of the early data forwarding and, in response, terminating the early data forwarding and initiating a release of the subject DRBs at the second network node.

10. The method of claim 9, wherein, with respect to the multi-connectivity, the second network node operates as a Source Secondary Node (S-SN) and the first network node operates as a Source Master Node (S-MN).

11. The method of claim 9, wherein the multi-connectivity is Multi-Radio Dual Connectivity (MR-DC) supported by the first network node and the second network node.

12. A second network node configured for operation in a wireless communication network, the second network node comprising:

first communication interface circuitry configured for communicatively coupling the second network node to one or more other network nodes;

second communication interface circuitry configured for communicatively coupling the second network node to wireless devices; and processing circuitry operatively associated with the first and second communication interface circuitry and configured to:

receive a Xn-U address indication message containing a conditional handover (CHO) indicator from a first network node, for initiation of early data forwarding from the second network node to the first network node, for data associated with a wireless device that is in multi-connectivity with the first and second network nodes, the CHO indicator indicating which data radio bearers (DRBs) at the second network node are subject to the early data forwarding;

responsive to the Xn-U address indication message containing the CHO indicator, initiate the early data forwarding to the first network node by transmitting an early data forwarding indication and early forwarding data to the first network node, the early forwarding data associated with subject DRBs; and receive a release request from the first network node subsequent to the initiation of the early data forwarding and, in response, terminate the early data forwarding and initiate a release of the subject DRBs.

13. The second network node of claim 12, wherein, with respect to the multi-connectivity, the second network node operates as a Source Secondary Node (S-SN) and the first network node operates as a Source Master Node (S-MN).

14. The second network node of claim 12, wherein the multi-connectivity is Multi-Radio Dual Connectivity (MR-DC) supported by the first network node and the second network node.

* * * * *